US012671737B2

(12) United States Patent
Shi

(10) Patent No.: US 12,671,737 B2
(45) Date of Patent: Jun. 30, 2026

(54) IN-VEHICLE APPLICATION TRANSFER METHOD AND TERMINAL

(71) Applicant: HUAWEI TECHNOLOGIES CO., LTD., Shenzhen (CN)

(72) Inventor: Xintian Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 222 days.

(21) Appl. No.: 18/675,124

(22) Filed: May 27, 2024

(65) Prior Publication Data

US 2024/0396972 A1     Nov. 28, 2024

Related U.S. Application Data

(63) Continuation of application No. PCT/CN2022/129579, filed on Nov. 3, 2022.

(30) Foreign Application Priority Data

Nov. 25, 2021     (CN) .......................... 202111416116.X

(51) Int. Cl.
| | |
|---|---|
| G06F 15/16 | (2006.01) |
| G01S 13/02 | (2006.01) |
| H04L 67/125 | (2022.01) |
| H04W 4/02 | (2018.01) |
| H04W 4/40 | (2018.01) |

(52) U.S. Cl.
CPC ........ H04L 67/125 (2013.01); G01S 13/0209 (2013.01); H04W 4/023 (2013.01); H04W 4/40 (2018.02)

(58) Field of Classification Search
CPC ...... H04L 67/125; H04W 4/40; H04W 4/023; G01S 13/0209
USPC .......................................................... 709/232
See application file for complete search history.

(56) References Cited

U.S. PATENT DOCUMENTS

| | | | | |
|---|---|---|---|---|
| 2015/0341755 A1* | 11/2015 | Choi | ..................... | B60K 35/10 |
| | | | | 455/457 |
| 2016/0301808 A1* | 10/2016 | Choi | ....................... | H04W 4/48 |
| 2022/0161759 A1* | 5/2022 | Hirose | ............... | G07C 9/00309 |
| 2022/0355813 A1* | 11/2022 | Salter | .................. | G06V 10/945 |
| 2024/0333996 A1* | 10/2024 | Wang | .............. | H04N 21/43078 |

* cited by examiner

*Primary Examiner* — Alan S Chou

(57) ABSTRACT

An in-vehicle application transfer method and a terminal relating to the field of intelligent terminals provides for automatically establishing a correspondence between an in-vehicle passenger space and a mobile terminal. An application on the mobile terminal is automatically transferred to a display in front of a passenger seating area to improve application use experience. A position of the mobile terminal is detected through an ultra-wideband (UWB) base station, and position of the passenger space is detected through a millimeter wave radar. A correspondence between the mobile terminal and the passenger space is established when the position of the mobile terminal coincides with the position of the passenger space and transferring an application running on the mobile terminal to a vehicle-mounted terminal including a display on the vehicle-mounted terminal corresponding to the passenger seating area.

20 Claims, 13 Drawing Sheets

(a)

(b)

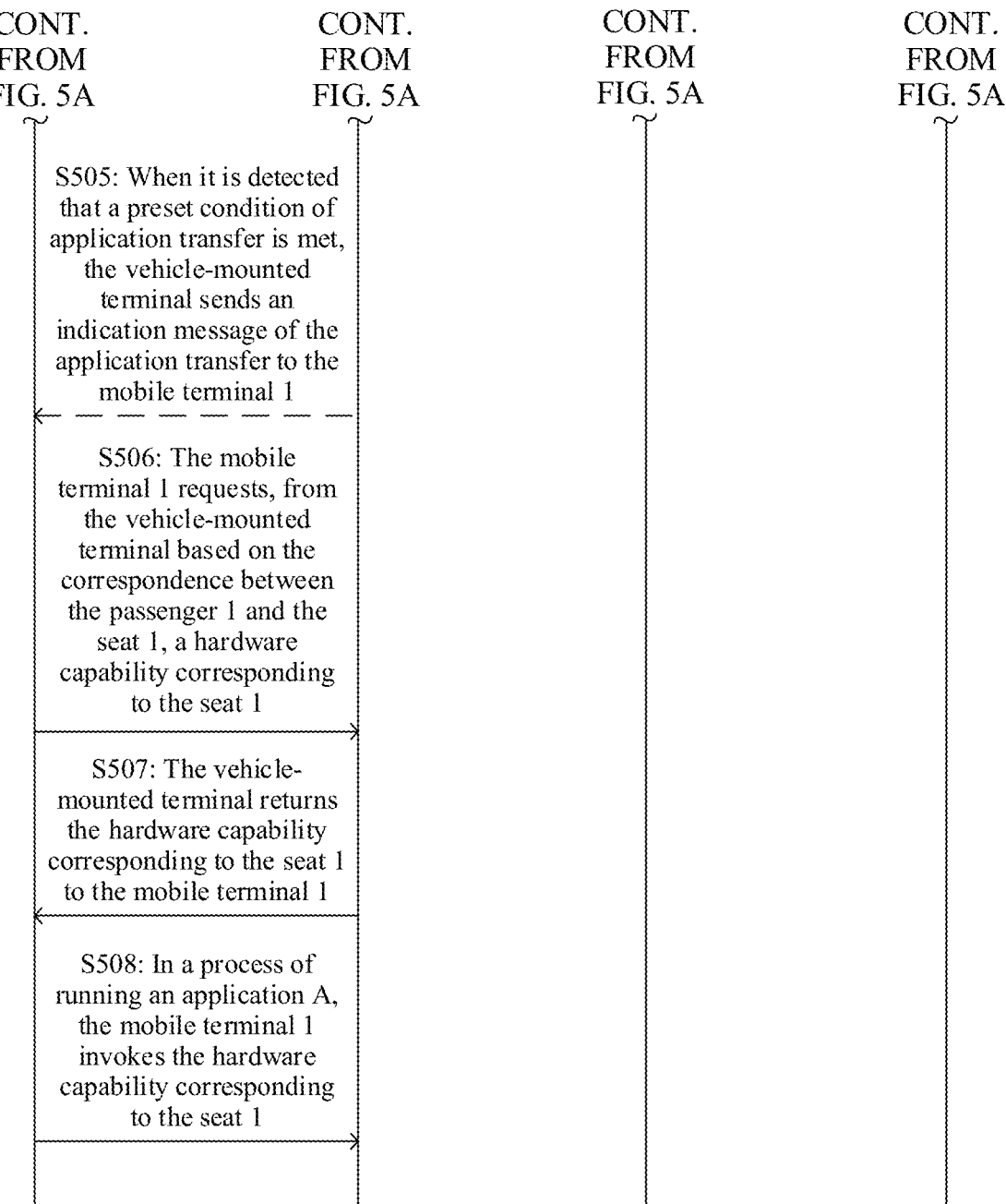

CONT.
FROM
FIG. 5A

CONT.
FROM
FIG. 5A

CONT.
FROM
FIG. 5A

CONT.
FROM
FIG. 5A

S505: When it is detected that a preset condition of application transfer is met, the vehicle-mounted terminal sends an indication message of the application transfer to the mobile terminal 1

S506: The mobile terminal 1 requests, from the vehicle-mounted terminal based on the correspondence between the passenger 1 and the seat 1, a hardware capability corresponding to the seat 1

S507: The vehicle-mounted terminal returns the hardware capability corresponding to the seat 1 to the mobile terminal 1

S508: In a process of running an application A, the mobile terminal 1 invokes the hardware capability corresponding to the seat 1

FIG. 5B

IN-VEHICLE APPLICATION TRANSFER METHOD AND TERMINAL

CROSS-REFERENCE TO RELATED APPLICATIONS

This application is a continuation of International Application No. PCT/CN2022/129579 filed on Nov. 3, 2022, which claims priority to Chinese Patent Application No. 202111416116.X filed on Nov. 25, 2021, all of which are hereby incorporated by reference in their entireties.

TECHNICAL FIELD

Disclosed embodiments relate to the field of intelligent terminals, and in particular, to an in-vehicle application transfer method and a terminal.

BACKGROUND

With the rapid development of electronic information technologies, vehicle-mounted terminals become more intelligent. Compared with a conventional automobile cockpit, an intelligent cockpit has more entertainment applications, more displays, and the like.

Outside an automobile, a user may use a mobile terminal like a mobile phone to watch a video, make a call, and the like. When the user enters the automobile, the user tends to use a display in the intelligent cockpit to watch a video, make a call, and the like. How to realize insensible application transfer between a mobile terminal and an intelligent cockpit becomes a hot topic of research by a technician in the industry.

SUMMARY

According to an in-vehicle application transfer method and a terminal provided in this disclosure, a correspondence between an in-vehicle passenger and a mobile terminal can be automatically established, and an application on the mobile terminal can be automatically transferred to a display in front of a seat in which the passenger is located. This improves application use experience.

To achieve the foregoing objective, embodiments of this disclosure provide the following technical solutions.

According to a first aspect, an embodiment provides an in-vehicle application transfer system, including a mobile terminal, a vehicle-mounted terminal, a UWB base station, and a millimeter wave radar apparatus. The vehicle-mounted terminal includes at least two displays. The vehicle-mounted terminal is configured to: receive a first position that is of the mobile terminal and that is sent by the UWB base station and receive a second position that is of a first passenger and that is sent by the millimeter wave radar apparatus. The vehicle-mounted terminal is further configured to: when the first position and the second position belong to a same seat area, establish a first correspondence between the mobile terminal and the first passenger; and when the second position of the first passenger corresponds to an area of a first seat, the vehicle-mounted terminal establishes a second correspondence between the first passenger and the first seat; and the vehicle-mounted terminal is further configured to send the second correspondence to the mobile terminal. The mobile terminal is configured to transfer, based on the second correspondence, a first application running on the mobile terminal to a first display on the vehicle-mounted terminal, where the first display is a display corresponding to the first seat.

The first passenger may be a driver or may be another passenger in an automobile.

In conclusion, according to the system provided in this embodiment, the first correspondence between the first passenger and the mobile terminal can be automatically established, and the second correspondence between the first passenger and the first seat can be established based on the position of the first passenger. Then, the application running on the mobile terminal corresponding to the first passenger may be transferred to the first display on the vehicle-mounted terminal, where the first display is a display corresponding to the first seat corresponding to the first passenger. For example, the first display is a display in front of the first seat. It can be learned that, after the first passenger carries the mobile terminal into the automobile, the system automatically transfers the first application on the mobile terminal to a specific display on the vehicle-mounted terminal, and this brings immersive application use experience to the first passenger.

It should be noted that, in some other embodiments, in addition to the display, the first seat may alternatively correspond to other hardware, for example, a camera, an audio output device, or an audio input device. Similar to the display, the vehicle-mounted terminal may invoke, based on the seat of the first passenger, other hardware corresponding to the seat. For example, an audio device corresponding to the first seat is invoked to play the first application. It may be understood that a camera corresponding to the first seat can capture an image of an area (including the first passenger) in which the first seat is located, and the first passenger does not need to lift the mobile terminal or specially adjust a posture, and this improves experience of the passenger using the first application. The audio device corresponding to the first seat can ensure audio experience of the first passenger when the first passenger is in the first seat.

With reference to the first aspect, in a possible implementation, the vehicle-mounted terminal is further configured to send a first message to the mobile terminal when a first preset condition is met. That the mobile terminal transfers, based on the second correspondence, a first application running on the mobile terminal to a first display on the vehicle-mounted terminal specifically includes: in response to receiving the first message, the mobile terminal requests information about the first display corresponding to the first seat from the vehicle-mounted terminal; and the mobile terminal invokes, based on the information about the first display, the first display to display an interface of the first application running on the mobile terminal.

Therefore, a specific implementation of transferring the first application on the mobile terminal to the vehicle-mounted terminal is provided.

With reference to the first aspect, in a possible implementation, the vehicle-mounted terminal is further configured to send a first message to the mobile terminal when a first preset condition is met. That the mobile terminal transfers, based on the second correspondence, a first application running on the mobile terminal to a first display on the vehicle-mounted terminal, where the first display is a display corresponding to the first seat specifically includes: in response to receiving the first message, the mobile terminal sends information about the first application running on the mobile terminal to the vehicle-mounted terminal; and the vehicle-mounted terminal starts the first application on the vehicle-mounted terminal based on the information about the first application, and invokes, based on the second correspondence, the first display to display an interface of the first application.

Therefore, another specific implementation of transferring the first application on the mobile terminal to the vehicle-mounted terminal is provided.

With reference to the first aspect, in a possible implementation, the vehicle-mounted terminal is further configured to receive a second message that meets the first preset condition and that is sent by the millimeter wave radar apparatus, where the first preset condition includes that the millimeter wave radar apparatus detects an action of putting down the mobile terminal by the first passenger.

In other words, the system can detect an action of the first passenger, and when it is detected that the first passenger puts down the mobile terminal, the first application on the mobile terminal is automatically transferred to the vehicle-mounted terminal, to facilitate the release of hands of the first passenger, and the first passenger can handle another thing.

With reference to the first aspect, in a possible implementation, the mobile terminal is further configured to: when a second preset condition is met, stop transferring the first application to the first display on the vehicle-mounted terminal; or the vehicle-mounted terminal is further configured to: when a second preset condition is met, stop transferring the first application to the first display on the vehicle-mounted terminal.

It can be learned that, in this system, the first application transferred to the vehicle-mounted terminal may be transferred back to the mobile terminal again.

With reference to the first aspect, in a possible implementation, the vehicle-mounted terminal is further configured to receive a third message that meets the second preset condition and that is sent by the millimeter wave radar apparatus, where the second preset condition includes that the millimeter wave radar apparatus detects an action of picking up the mobile terminal by the first passenger, or detects that the first passenger leaves an automobile.

In other words, when detecting the action of picking up the mobile terminal by the first passenger or detecting that the first passenger leaves the automobile, the system transfers the first application transferred to the vehicle-mounted terminal back to the mobile terminal again.

With reference to the first aspect, in a possible implementation, the vehicle-mounted terminal is further configured to: when the second position of the first passenger corresponds to an area of a second seat, establish a third correspondence between the first passenger and the second seat; the vehicle-mounted terminal is further configured to send the third correspondence to the mobile terminal; and the mobile terminal is configured to transfer, based on the third correspondence, the first application displayed on the first display of the vehicle-mounted terminal to a second display of the vehicle-mounted terminal, where the second display is a display corresponding to the second seat.

In other words, the system can detect a change of the seat of the first passenger in the automobile, and automatically switch the display to display the first application based on the change of the seat of the first passenger, so that the application transfer is more intelligent and user-friendly, and use experience of the user is improved.

According to a second aspect, an embodiment further provides an in-vehicle application transfer method, applied to a vehicle-mounted terminal, where the vehicle-mounted terminal separately establishes a wired or wireless connection to a mobile terminal, a UWB base station, and a millimeter wave radar apparatus. In addition, the vehicle-mounted terminal includes at least two displays. The vehicle-mounted terminal receives a first position that is of the mobile terminal and that is sent by the UWB base station and receives a second position that is of a first passenger and that is sent by the millimeter wave radar apparatus. When the first position and the second position belong to a same seat area, the vehicle-mounted terminal establishes a first correspondence between the mobile terminal and the first passenger; and when the second position of the first passenger corresponds to an area of a first seat, the vehicle-mounted terminal establishes a second correspondence between the first passenger and the first seat; and the vehicle-mounted terminal sends the second correspondence to the mobile terminal. The second correspondence is used by the mobile terminal to transfer a first application running on the mobile terminal to a first display on the vehicle-mounted terminal, and the first display is a display corresponding to the first seat on the vehicle-mounted terminal.

With reference to the second aspect, in a possible implementation, when a first preset condition is met, the vehicle-mounted terminal sends a first message to the mobile terminal, where the first message is used to notify the mobile terminal to start application transfer; receives a first request sent by the mobile terminal, where the first request is used to request information about the first display corresponding to the first seat; and returns the information about the first display corresponding to the first seat to the mobile terminal, where the information about the first display is used by the mobile terminal to invoke the first display of the vehicle-mounted terminal to display an interface of the first application running on the mobile terminal.

With reference to the second aspect, in a possible implementation, when a first preset condition is met, the vehicle-mounted terminal sends a first message to the mobile terminal, where the first message is used to notify the mobile terminal to start application transfer; and receives information that is about the first application and that is sent by the mobile terminal. The vehicle-mounted terminal starts the first application on the vehicle-mounted terminal based on the information about the first application, and invokes, based on the second correspondence, the first display to display an interface of the first application.

With reference to the second aspect, in a possible implementation, before the vehicle-mounted terminal sends the first message to the mobile terminal, the method further includes: The vehicle-mounted terminal receives a second message that meets the first preset condition and that is sent by the millimeter wave radar apparatus, where the first preset condition includes that the millimeter wave radar apparatus detects an action of putting down the mobile terminal by the first passenger.

With reference to the second aspect, in a possible implementation, after the mobile terminal transfers, based on the second correspondence, the first application running on the mobile terminal to the first display on the vehicle-mounted terminal, the method further includes: When a second preset condition is met, the vehicle-mounted terminal stops transferring the first application on the mobile terminal to the first display on the vehicle-mounted terminal; or the vehicle-mounted terminal notifies the mobile terminal to stop transferring the first application to the first display on the vehicle-mounted terminal.

With reference to the second aspect, in a possible implementation, before the vehicle-mounted terminal stops transferring the first application on the mobile terminal to the first display on the vehicle-mounted terminal, or before the vehicle-mounted terminal notifies the mobile terminal to stop transferring the first application to the first display on the vehicle-mounted terminal, the method further includes: The vehicle-mounted terminal receives a third message that meets the second preset condition and that is sent by the millimeter wave radar apparatus, where the second preset condition includes that the millimeter wave radar apparatus detects an action of picking up the mobile terminal by the first passenger or detects that the first passenger leaves an automobile.

With reference to the second aspect, in a possible implementation, after the mobile terminal transfers, based on the second correspondence, the first application running on the mobile terminal to the first display on the vehicle-mounted terminal, the method further includes: When the second position of the first passenger corresponds to an area of a second seat, the vehicle-mounted terminal establishes a third correspondence between the first passenger and the second seat; and the vehicle-mounted terminal sends the third correspondence to the mobile terminal. The third correspondence is used by the mobile terminal to transfer the first application displayed on the first display of the vehicle-mounted terminal to a second display of the vehicle-mounted terminal, where the second display is a display corresponding to the second seat.

For technical effects corresponding to the second aspect or any implementation of the second aspect, refer to technical effects corresponding to the first aspect or any implementation of the first aspect. Details are not described herein again.

According to a third aspect, a vehicle-mounted terminal is provided, including a processor, a memory, and a display, where the memory and the display are coupled to the processor, the memory is configured to store computer program code, the computer program code includes computer instructions, and when the processor reads the computer instructions from the memory, the vehicle-mounted terminal is enabled to perform the method in any one of the second aspect or the implementations of the second aspect.

According to a fourth aspect, a computer-readable storage medium is provided. The computer-readable storage medium stores a computer program (which may also be referred to as instructions or code). When the computer program is executed by a vehicle-mounted terminal, the vehicle-mounted terminal is enabled to perform the method in any one of the second aspect or the implementations of the second aspect.

According to a fifth aspect, a computer program product is provided. The computer program product includes a computer program (which may also be referred to as instructions or code). When the computer program is executed by a vehicle-mounted terminal, the vehicle-mounted terminal is enabled to perform the method in any one of the second aspect or the implementations of the second aspect.

It should be noted that for technical effects of the vehicle-mounted terminal provided in the third aspect, the computer-readable storage medium provided in the fourth aspect, and the computer program product provided in the fifth aspect, refer to technical effects corresponding to the second aspect or the implementations of the second aspect. Details are not described herein again.

BRIEF DESCRIPTION OF DRAWINGS

FIG. 5A and FIG. 5B are schematic flowcharts of an application transfer method according to an embodiment of this disclosure;

DESCRIPTION OF EMBODIMENTS

The following describes the technical solutions in embodiments of this disclosure with reference to the accompanying drawings. Terms used in the descriptions of embodiments are merely intended to describe specific embodiments, but are not intended to limit the scope of this disclosure. As used in the specification and the appended claims, the singular expression "a/an", "the", "the foregoing", "such a", or "this" is intended to also include "one or more" expression unless otherwise clearly indicated in the context. It should be further understood that in the following embodiments of this disclosure, "at least one" and "one or more" mean one or more than two (including two). The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects.

Reference to "an embodiment", "some embodiments" or the like described in this specification indicates that one or more embodiments of this disclosure include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner. The term "connection" includes direct connection and indirect connection, unless otherwise specified. "First" and "second" are merely intended for a purpose of description and shall not be understood as an indication or implication of relative importance or implicit indication of a quantity of indicated technical features.

The word "an example", "for example", or the like is used to represent giving an example, an illustration, or a description. Any embodiment or design scheme described as "an example" or "for example" in embodiments of this disclosure should not be construed as being more preferable or advantageous than other embodiments or design schemes. Exactly, use of the word "an example", "for example", or the like is intended to present a related concept in a specific manner.

Figure 1:
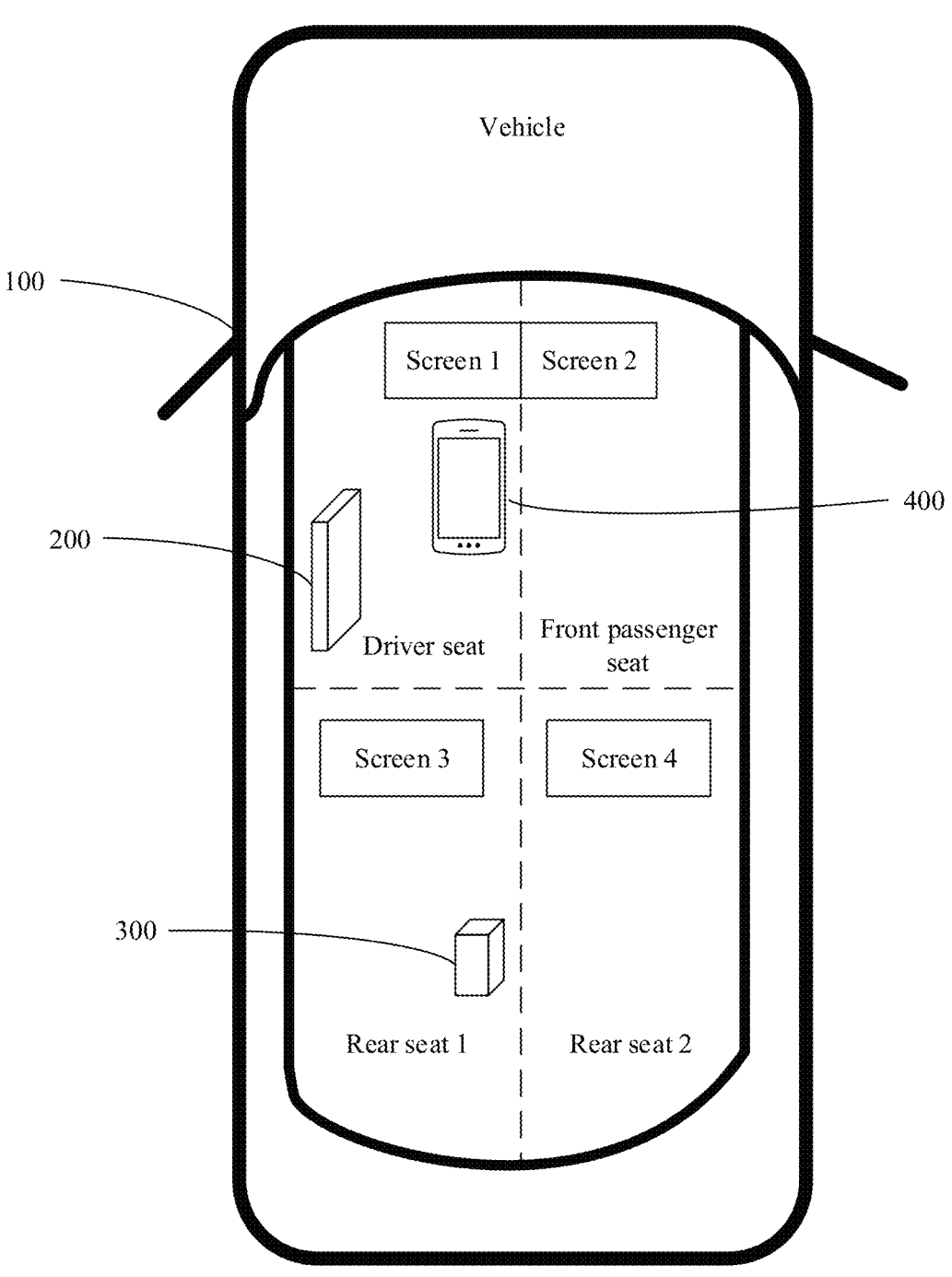
FIG. 1 is a schematic diagram of a scenario of in-vehicle application transfer according to an embodiment of this disclosure.

For example, FIG. 1 is a schematic diagram of a scenario of in-vehicle application transfer according to an embodiment of this disclosure. As shown in FIG. 1, a vehicle-mounted terminal 100 is disposed in a vehicle. For example, the vehicle-mounted terminal 100 is specifically an intelligent cockpit system, and may include at least two displays, such as a screen 1, a screen 2, a screen 3, and a screen 4 shown in FIG. 1, and the screen 1, the screen 2, the screen 3, and the screen 4 are respectively disposed in front of different seats in the vehicle (for example, a driver seat, a front passenger seat, a rear seat 1, a rear seat 2, and the like), to be viewed by passengers in different seats. Optionally, the vehicle-mounted terminal 100 may alternatively include at least two cameras, and the at least two cameras are distributed and disposed at different positions in the vehicle and may capture images of the passengers in the different seats. For example, a camera is disposed on each seat in the vehicle, and is respectively used to capture an image of a passenger on each seat. For another example, a camera is disposed in front seats in the vehicle to capture an image of a front passenger. A camera is disposed in rear seats in the vehicle to capture an image of a rear passenger. Optionally, the vehicle-mounted terminal 100 may alternatively include at least two sound boxes that are respectively disposed at different positions in the vehicle and are configured to provide audio playing for the passengers in the different seats. Optionally, the vehicle-mounted terminal 100 may alternatively include at least two microphones that are respectively disposed at different positions in the vehicle and are configured to collect voices and the like of the passengers in the different seats.

The vehicle-mounted terminal 100 is further connected to at least one ultra-wideband (UWB) base station 200, and the UWB base station 200 is configured to measure a position of a UWB tag (or a device configured with the UWB tag, such as a mobile terminal 400) in the vehicle. In an example, the vehicle-mounted terminal 100 is connected to at least three UWB base stations 200 with a single-antenna structure. It may be understood that a UWB base station 200 with the single-antenna structure may measure a distance between a UWB tag and a UWB base station 200. It can be learned from a principle of three-point positioning that at least three UWB base stations with the single-antenna structure work together to implement measurement of positioning of the UWB tag. In another example, the vehicle-mounted terminal 100 is connected to at least one UWB base station 200 with a three-antenna structure (or more than three antennas structure). It may be understood that a UWB base station 200 with the three-antenna structure (or more than three antennas structure) may independently measure the positioning of the UWB tag. In still another example, the vehicle-mounted terminal 100 may alternatively be connected to at least one UWB base station 200 with a three-antenna structure (or more than three antennas structure), and also be connected to at least one UWB base station 200 with the single-antenna structure. In yet another example, the vehicle-mounted terminal 100 may alternatively be connected to at least one UWB base station 200 with a two-antenna structure and at least one UWB base station 200 with the single-antenna structure. In this case, a UWB base station 200 with the two-antenna structure and a UWB base station 200 with the single-antenna structure work together to implement measurement of positioning of the UWB tag. An antenna structure, a deployment quantity, and a deployment position of the UWB base station 200 deployed in the vehicle are not limited in this embodiment of this disclosure.

In a specific implementation, at least one UWB base station 200 may be deployed in a middle position of a vehicle roof, so that the UWB base station 200 may measure a UWB tag near any seat in the vehicle. It should be noted that, in an actual design, a skilled person may determine a quantity of UWB base stations, a specific position, and the like based on a size of the vehicle, the antenna structure of the UWB base station 200, a positioning algorithm of the UWB base station 200, a measurement precision requirement, and the like. This is not specifically limited in this embodiment of this disclosure.

The vehicle-mounted terminal 100 and the UWB base station 200 may communicate with each other through a wired connection or a wireless connection. A communication manner between the vehicle-mounted terminal 100 and the UWB base station 200 is not limited in this embodiment of this application. In some other embodiments, the vehicle-mounted terminal 100 and the UWB base station 200 may alternatively be integrated into one device.

The vehicle-mounted terminal 100 is further connected to at least one millimeter wave radar apparatus 300, and the at least one millimeter wave radar apparatus 300 is configured to measure a position of a passenger in the vehicle, a body movement of the passenger, and the like. In a specific implementation, at least one millimeter wave radar apparatus 300 may be deployed in the middle position of the vehicle roof, so that the millimeter wave radar apparatus 300 can accurately measure a passenger near any seat in the vehicle, a body movement of the passenger, and the like. It should be noted that, in an actual design, a skilled person may determine a quantity of millimeter wave radar apparatuses 300, a specific position, and the like based on a size of the vehicle, a measurement precision requirement, and the like. This is not specifically limited in this embodiment of this disclosure.

The vehicle-mounted terminal 100 and the millimeter wave radar apparatus 300 may communicate with each other through a wired connection or a wireless connection. A communication manner between the vehicle-mounted terminal 100 and the millimeter wave radar apparatus 300 is not limited in this embodiment of this disclosure.

In some other embodiments, the vehicle-mounted terminal 100 and the millimeter wave radar apparatus 300 may alternatively be integrated into one device. In yet some embodiments, the UWB base station 200 and the millimeter wave radar apparatus 300 may alternatively be integrated into one device. In yet some embodiments, the UWB base station 200, the millimeter wave radar apparatus 300, and the vehicle-mounted terminal 100 may be integrated into one device. A specific form between the UWB base station 200, the millimeter wave radar apparatus 300, and the vehicle-mounted terminal 100 is not specifically limited in this embodiment of this disclosure.

The mobile terminal 400 in FIG. 1 is a portable device carried by a passenger, for example, a mobile phone or a smartwatch. In this embodiment of this application, the mobile terminal 400 is configured with a UWB module that can implement a function of a UWB tag. In other words, the UWB base station 200 deployed in the vehicle may measure a position of the mobile terminal 400 in the vehicle.

In addition, the millimeter wave radar apparatus 300 deployed in the vehicle may measure a position of a user (that is, the passenger) of the mobile terminal 400 in the vehicle. The vehicle-mounted terminal 100 may establish an association relationship between the mobile terminal 400 and the user of the mobile terminal 400. As described above, the vehicle-mounted terminal 100 includes a plurality of displays, and the plurality of displays are respectively disposed in front of different seats in the vehicle and can be viewed by passengers of the different seats. Therefore, the vehicle-mounted terminal 100 automatically switches, based on the position of the user of the mobile terminal 400, an application running on the mobile terminal 400 to a display in front of the position of the user, so that the user can view and operate the application.

Figure 2:
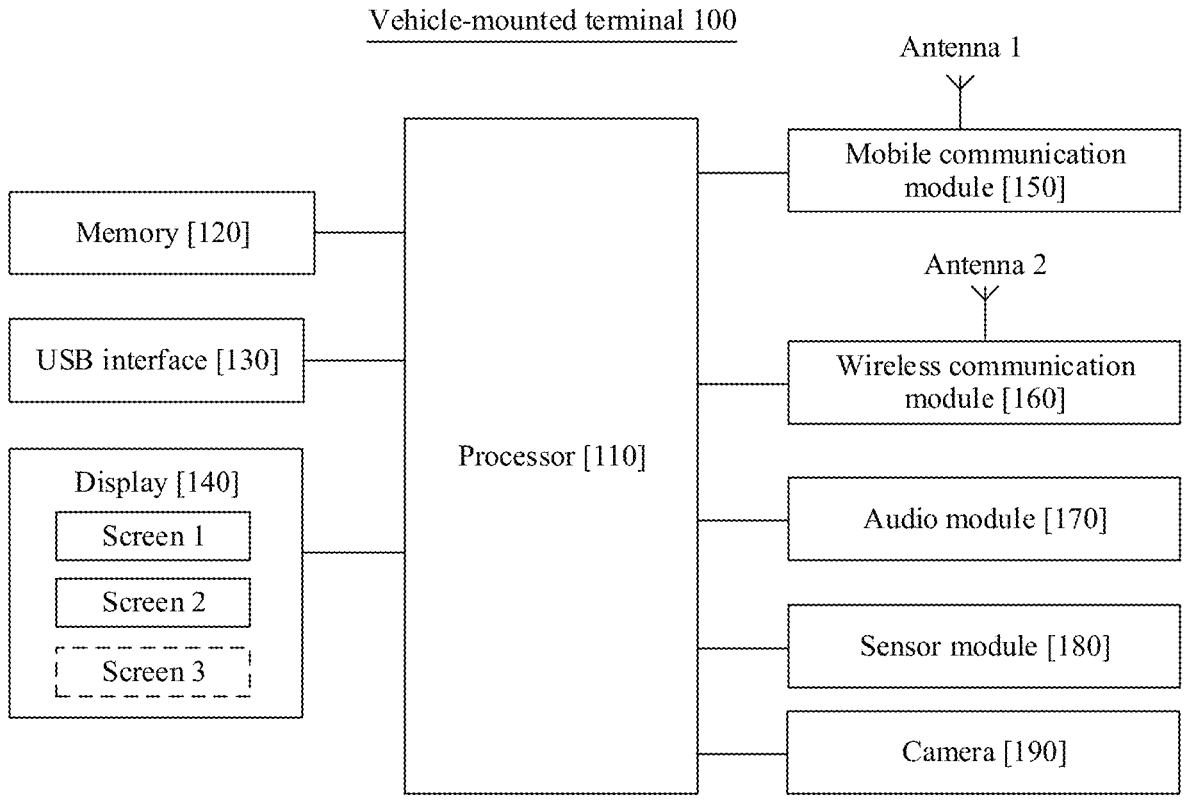
FIG. 2 is a schematic diagram of a structure of a vehicle-mounted terminal according to an embodiment of this disclosure.

FIG. 2 is a schematic diagram of a structure of a vehicle-mounted terminal 100 according to an embodiment of this disclosure.

The vehicle-mounted terminal 100 may include a processor 110, a memory 120, a universal serial bus (universal serial bus, USB) interface 130, at least two displays 140, a mobile communication module 150, a wireless communication module 160, an audio module 170, a sensor module 180, a camera 190, and the like.

It may be understood that the structure shown in this embodiment does not constitute a specific limitation on the vehicle-mounted terminal 100. In some other embodiments of this disclosure, the vehicle-mounted terminal 100 may include more or fewer components than those shown in the figure, or some components may be combined, or some components may be split, or different component arrangements may be used. The illustrated components may be implemented in hardware, software, or a combination of software and hardware.

For example, in some other embodiments, the vehicle-mounted terminal 100 may alternatively include a UWB module, configured to implement a function of a UWB base station. The UWB module includes at least three UWB antennas, configured to measure positioning of a UWB tag (for example, a mobile terminal 400) in a vehicle. The vehicle-mounted terminal 100 may further/alternatively include a millimeter wave radar, configured to measure a position of a passenger in the vehicle, a body movement, and the like.

In addition, an interface connection relationship between the modules shown in this embodiment of the present invention is merely an example for description and does not constitute a limitation on the structure of the vehicle-mounted terminal 100. In some other embodiments of this application, the vehicle-mounted terminal 100 may alternatively use different interface connection manners or a combination of a plurality of interface connection manners in the foregoing embodiment.

The processor 110 may include one or more processing units. For example, the processor 110 may include an application processor (AP), a modem processor, a graphics processing unit (GPU), a controller, a video codec, a digital signal processor (DSP), a baseband processor, a neural-network processing unit (NPU), and/or the like. Different processing units may be independent components or may be integrated into one or more processors.

The memory 120 may be configured to store computer-executable program code. The executable program code includes instructions. The memory 120 may include a program storage area and a data storage area. The program storage area may store an operating system, an application required by at least one function (for example, a sound playing function or an image playing function), and the like. The data storage area may store data (such as audio data and a phone book) created in a process of using the vehicle-mounted terminal 100. In addition, the memory 120 may include a high-speed random access memory, or may include a nonvolatile memory, for example, at least one magnetic disk storage device, a flash memory, or a universal flash storage (UFS). The processor 110 executes various functional applications and data processing of the vehicle-mounted terminal 100 by running the instructions stored in the memory 120 and/or the instructions stored in the memory disposed in the processor.

A wireless communication function of the vehicle-mounted terminal 100 may be implemented through an antenna 1, an antenna 2, the mobile communication module 150, the wireless communication module 160, the modem processor, the baseband processor, and the like.

The antenna 1 and the antenna 2 are configured to transmit and receive electromagnetic wave signals. Each antenna in the vehicle-mounted terminal 100 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the vehicle-mounted terminal 100 and includes a 2G/3G/4G/5G or the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the vehicle-mounted terminal 100. The wireless communication module 160 may be one or more devices integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the vehicle-mounted terminal 100 is coupled to the mobile communication module 150, and the antenna 2 is coupled to the wireless communication module 160, so that the vehicle-mounted terminal 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The vehicle-mounted terminal 100 may implement a display function through the GPU, the display 140, the application processor, and the like. The GPU is a microprocessor for image processing and is connected to the display 140 and the application processor. The GPU is used to perform mathematical and geometric calculations and render an image. The processor 110 may include one or more GPUs that execute program instructions to generate or change display information.

The vehicle-mounted terminal 100 may implement an audio function, like music playing, recording, and the like by using the audio module 170, the application processor, or the like.

Figures 3A, 3B, 3D:
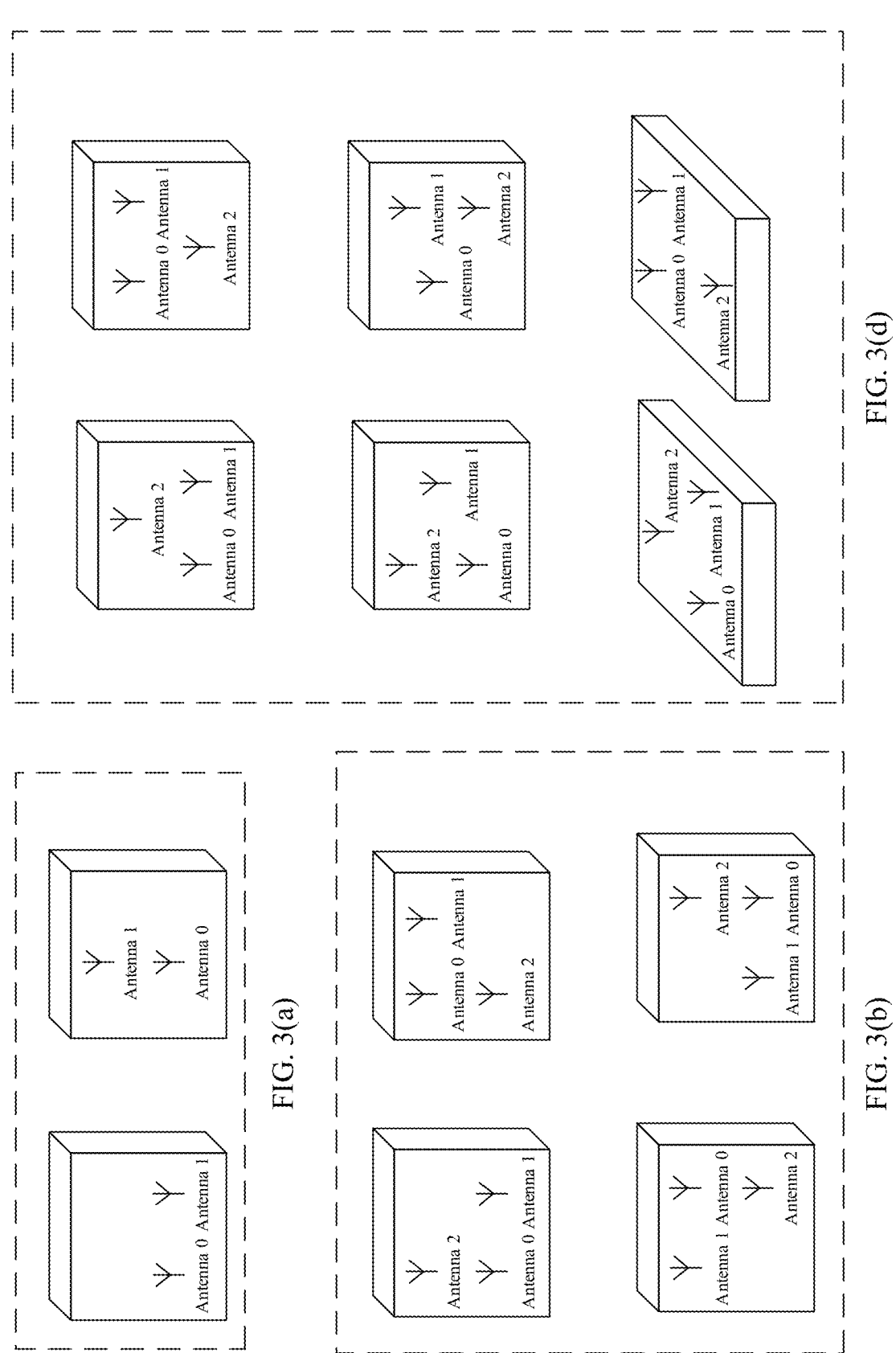
FIG. 3(*a*), FIG. 3(*b*), FIG. 3(*c*), FIG. 3(*d*) and FIG. 3(*e*) are schematic diagrams of illustrative antenna distributions in a UWB base station according to an embodiment of this disclosure.

For example, FIG. 3(a) to FIG. 3(e) show several antenna distributions in a UWB base station 200 according to an embodiment of this application. FIG. 3(a) shows two two-antenna structures as an example. One is a transverse (for example, a horizontal) antenna structure, and the other is a longitudinal (for example, a vertical) antenna structure. Preferably, a distance between an antenna 0 and an antenna 1 is λ/2, where λ is a wavelength of a UWB signal. The transverse antenna structure may be used to measure a transverse incoming direction (for example, a horizontal incoming direction) of the UWB signal, and the longitudinal antenna structure may be used to measure a longitudinal incoming direction (for example, a plumb incoming direction) of the UWB signal. In an implementation, a UWB base station 200 on a left side and a UWB base station 200 on a right side shown in FIG. 3(a) may cooperate with each other (for example, the above two UWB base stations 200 are arranged at a specified angle) to detect a signal incoming direction including a UWB tag (for example, a mobile terminal 400).

Figures 3C, 3E:
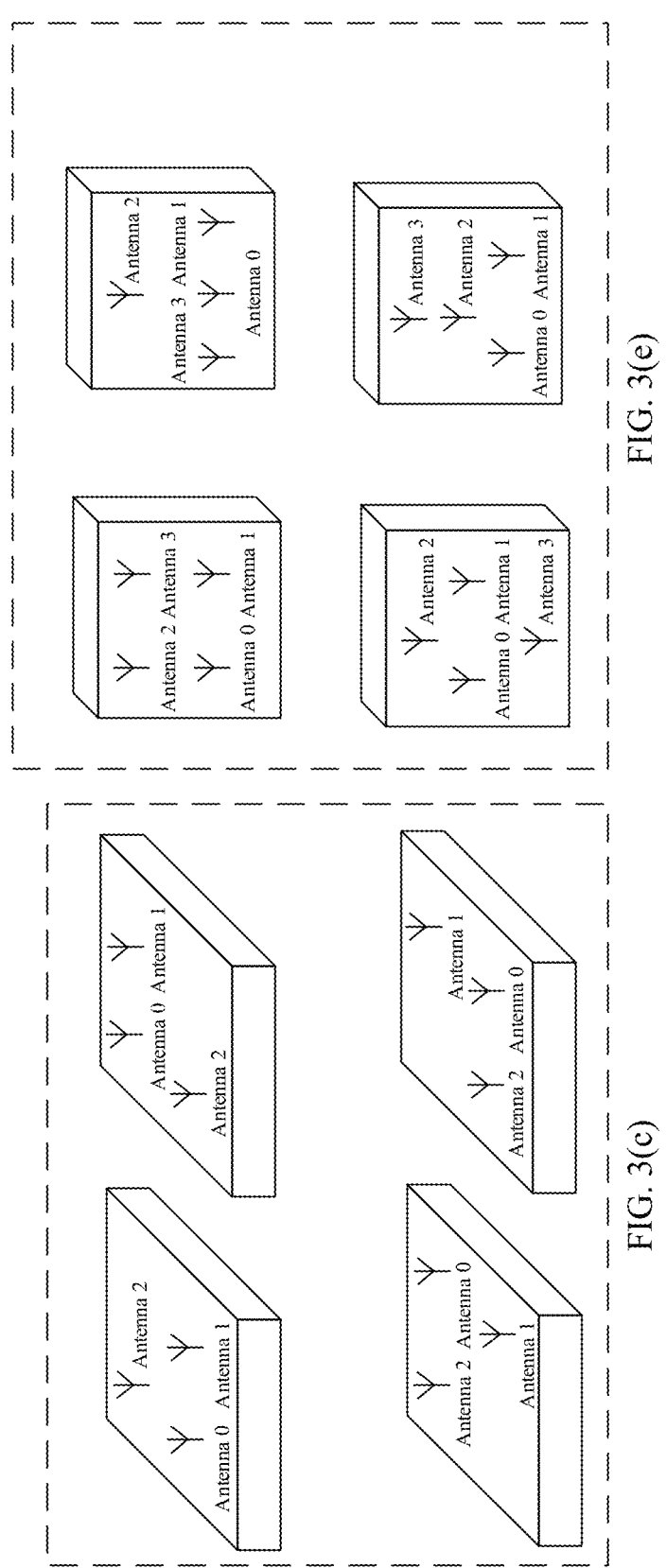

For example, FIG. 3(b) and FIG. 3(c) show three-antenna structures. As shown in FIG. 3(b) and FIG. 3(c), three antennas show an L-shaped (or referred to as a right triangle) structural relationship. As shown in FIG. 3(b), the antenna 0 and the antenna 1 are aligned in the transverse direction (for example, the horizontal direction), and the antenna 0 and an antenna 2 are aligned in the longitudinal direction (for example, the plumb direction). To be specific, a plane on which the antenna 0, the antenna 1, and the antenna 2 are located is a longitudinal plane (for example, the longitudinal plane), and an L-shaped distribution relationship is present on the longitudinal plane. As shown in FIG. 3(c), a plane on which the antenna 0, the antenna 1, and the antenna 2 are located is a transverse plane (for example, a horizontal plane), and a connection line between the antenna 0 and the antenna 1 (assuming that there is a connection line between the antenna 0 and the antenna 1) is perpendicular to a connection line between the antenna 0 and the antenna 2 (assuming that there is a connection line between the antenna 0 and the antenna 2). That is, the antenna 0, the antenna 1, and the antenna 2 show an L-shaped distribution relationship on the transverse plane. For example, when the antenna 0, the antenna 1, and the antenna 2 are distributed in an L shape, a distance between the antenna 0 and the antenna 1 and a distance between the antenna 0 and the antenna 2 may be less than or equal to λ/2, where λ is a wavelength of a UWB signal. The distance between the antenna 0 and the antenna 1 and the distance between the antenna 0 and the antenna 2 may be the same or may be different.

For example, FIG. 3(d) shows some other three-antenna structures. As shown in FIG. 3(d), three antennas show a triangle (for example, an equilateral triangle or an isosceles triangle) structural relationship. For example, a plane on which the antenna 0, the antenna 1, and the antenna 2 are located is the longitudinal plane (for example, a plumb plane) and the antenna 0, the antenna 1, and the antenna 2 are distributed in a triangle on the longitudinal plane. For another example, the antenna 0, the antenna 1, and the antenna 2 are distributed in a triangle on the transverse plane (for example, the horizontal plane). For example, when the antenna 0, the antenna 1, and the antenna 2 are distributed in a triangle, a distance between any two antennas of the antenna 0, the antenna 1, and the antenna 2 may be less than or equal to λ/2, where λ is a wavelength of a UWB signal. In addition, the distance between any two antennas of the antenna 0, the antenna 1, and the antenna 2 may be the same or may be different. For example, a distance between the antenna 0 and the antenna 1 is λ/2. A distance between the antenna 0 and the antenna 2 is $\sqrt{3}\lambda/2$.

It may be understood that a case in which there are more than three antennas also falls within the scope of this application. For example, as shown in FIG. 3(e), four antennas, namely, the antenna 0, the antenna 1, the antenna 2, and an antenna 3, are distributed in a rectangle. Any three of the four antennas are in L-shaped distribution or triangular distribution described above.

For example, a UWB base station 200 obtains a transverse incoming direction of a UWB signal based on a phase difference when the UWB signal sent by a mobile terminal 400 arrives at two transverse distributed antennas of the UWB base station 200. A longitudinal incoming direction of the UWB signal is obtained based on a phase difference when the UWB signal sent by the mobile terminal 400 arrives at two longitudinally distributed antennas of the UWB base station 200. Further, the UWB base station 200 obtains an incoming direction of the UWB signal based on the transverse incoming direction and the longitudinal incoming direction.

In other examples, the UWB base station 200 may include only one antenna. In this case, more than three UWB base stations 200 need to be used, and the more than three UWB base stations 200 are distributed in an L shape or a triangle shape, so as to jointly obtain the incoming direction of the UWB signal. A specific principle is similar to that described above. Details are not described herein again.

A quantity and distribution of antennas in the UWB base station 200 are not limited in this embodiment of this disclosure, provided that the incoming direction of the UWB signal can be obtained.

It may be understood that the UWB base station 200 may alternatively include other modules, such as a storage module, a communication module, and a processing module. For other structures, refer to descriptions of related modules in the vehicle-mounted terminal 100 shown in FIG. 2. Details are not described herein again. In some other embodiments, the UWB base station 200 may alternatively be integrated into the vehicle-mounted terminal 100. This is not limited in this embodiment of this disclosure.

Figure 4:
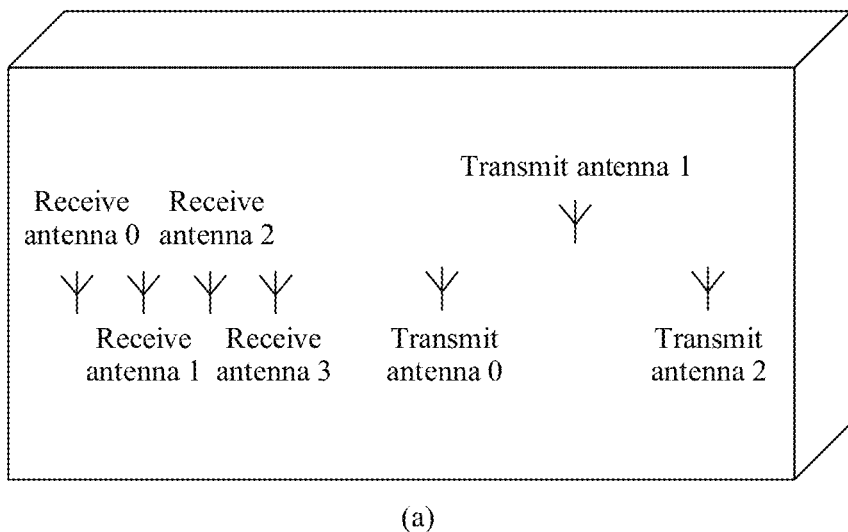
FIG. 4(*a*) and FIG. 4(*b*) are schematic diagrams of illustrative antenna distributions a millimeter wave radar apparatus according to an embodiment of this disclosure.
Figure 4:
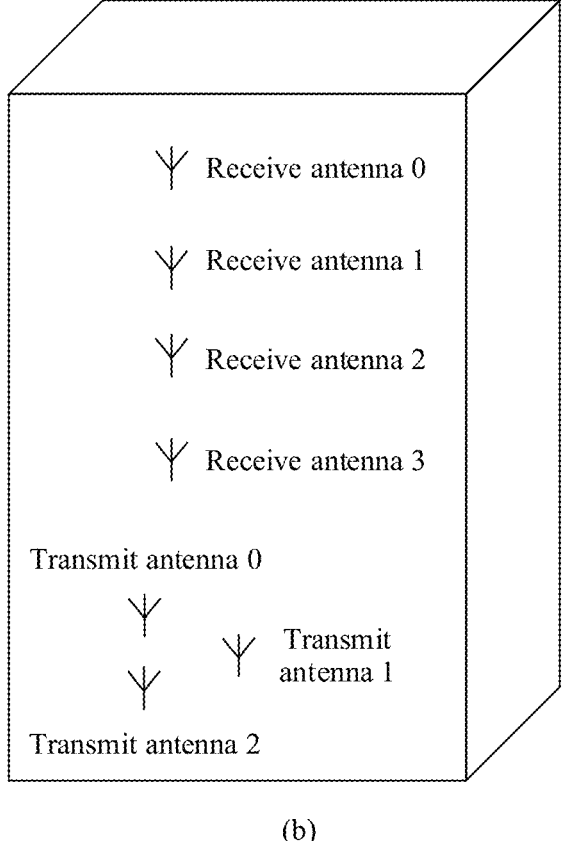

For example, FIG. 4 shows a plurality of antenna distributions of a millimeter wave radar apparatus 300 according to an embodiment of this application. For example, transmit antennas of the millimeter wave radar apparatus 300 include a transmit antenna 0, a transmit antenna 1 and a transmit antenna 2. Receive antennas of the millimeter wave radar apparatus 300 include a receive antenna 0, a receive antenna 1, a receive antenna 2 and a receive antenna 3. Distribution of the transmit antenna 0, the transmit antenna 1, the transmit antenna 2, the receive antenna 0, the receive antenna 1, the receive antenna 2, and the receive antenna 3 may be shown in (a) or (b) in FIG. 4. The transmit antenna is configured to transmit an electromagnetic signal (such as an LFMCW) working in a millimeter wave band, and the receive antenna is configured to receive a signal that is reflected by a reflector (an object or a human body) by the electromagnetic signal working in the millimeter wave band. The millimeter wave radar apparatus 300 obtains a difference frequency signal based on a transmit signal and a receive signal and determines a position of the object or human body based on the difference frequency signal.

As shown in FIG. 4, three transmit antennas and four receive antennas are located on a same longitudinal plane (for example, a plumb plane), and the three transmit antennas are distributed in a triangle on the longitudinal plane. In an example, as shown in (a) in FIG. 4, the transmit antenna 0 and the transmit antenna 2 are located on a same transverse plane (for example, a horizontal plane), and the four receive antennas are located on a same transverse line (for example, a horizontal line). For example, distances between any two receive antennas are equal (for example, both are $\lambda L/2$). Distances between the transmit antenna 0 and the transmit antenna 2 are equal (for example, both are $2\lambda L$). A distance between the transmit antenna 1 and the transmit antenna 0 and a distance between the transmit antenna 1 and the transmit antenna 2 are equal in a longitudinal direction (for example, both are $\lambda L/2$). L is a wavelength of a highest frequency of a linear frequency-modulated continuous signal. In another example, as shown in (b) in FIG. 4, the transmit antenna 0 and the transmit antenna 2 are located on a same longitudinal line (for example, a plumb line), and the four receive antennas are located on a same longitudinal line (for example, the plumb line). Distances between any two receive antennas are equal (for example, the distances are $\lambda L/2$). Distances between the transmit antenna 0 and the transmit antenna 2 are equal (for example, both are $2\lambda L$). A distance between the transmit antenna 1 and the transmit antenna 0 and a distance between the transmit antenna 1 and the transmit antenna 2 are equal in a transverse direction (for example, both are $\lambda L/2$). It may be understood that a quantity and distribution of transmit antennas and/or receive antennas may be in other forms. This is not limited in this embodiment of this disclosure.

A plurality of transmit antennas and a plurality of receive antennas are configured to accurately measure a direction of a reflected signal, that is, an incoming direction of the reflected signal, including a transverse incoming direction (for example, a horizontal incoming direction) and a longitudinal incoming direction (for example, a plumb incoming direction), and a receiving aperture of a millimeter wave radar is increased as much as possible. The millimeter wave radar apparatus 300 may calculate a transverse incoming direction of a target based on a phase difference of a plurality of receive antennas of the reflected signal in the transverse incoming direction (for example, the horizontal direction). A longitudinal incoming direction of the target is calculated based on a phase difference of the plurality of receive antennas of the reflected signal in the longitudinal direction (for example, a plumb direction).

Optionally, a quantity of transmit antennas may be greater than or less than 3. Optionally, a quantity of receive antennas may be greater than 4 or less than 4. This is not limited in this application. In an implementation, there is at least one transmit antenna, and there are at least three receive antennas.

In an implementation, there is one transmit antenna, and there are three receive antennas. The three receive antennas, namely, the receive antenna 0, the receive antenna 1, and the receive antenna 2, are distributed in a triangle. For ease of description, it is assumed that a line (imaginary) between the receive antenna 0 and the receive antenna 1 is located in the transverse direction, and a line (imaginary) between the receive antenna 0 and the receive antenna 2 is located in the longitudinal direction. In this way, after the transmit signal of the transmit antenna is reflected by the reflector (the object or the human body), the three receive antennas respectively receive reflected signals. The millimeter wave radar apparatus 300 may obtain a transverse incoming direction (for example, a horizontal incoming direction) of the reflected signal based on a phase difference between the reflected signal respectively received by the receive antenna 0 and the receive antenna 1. A longitudinal incoming direction (for example, a plumb incoming direction) of the reflected signal is obtained based on a phase difference between the reflected signal respectively received by the receive antenna 0 and the receive antenna 2. Further, an incoming direction of the reflected signal may be determined based on the transverse incoming direction and the longitudinal incoming direction.

In another implementation, there are at least two transmit antennas, and there are at least two receive antennas. Two transmit antennas, namely, the transmit antenna 0 and the transmit antenna 1, and two receive antennas, namely, the receive antenna 0 and the receive antenna 1, are used as an example. It is assumed that a line (imaginary) between the transmit antenna 0 and the transmit antenna 1 is located in the transverse direction, and a line (imaginary) between the receive antenna 0 and the receive antenna 1 is located in the longitudinal direction. After respective transmit signals of the transmit antenna 0 and the transmit antenna 1 are respectively reflected by the reflector (the object or the human body), at least one receive antenna receives the reflected signal. The millimeter wave radar apparatus 300 may calculate a transverse incoming direction (for example, a horizontal incoming direction) of a signal after the transmit signal is reflected (in this case, the signal may also be referred to as the reflected signal) based on a phase difference between a signal transmitted by the transmit antenna 0 and a signal transmitted by the transmit antenna 1 arriving at a same receive antenna. After the transmit signal of the transmit antenna is reflected by the reflector (the object or the human body), two receive antennas respectively receive the reflected signal. A longitudinal incoming direction (for example, a plumb incoming direction) of the reflected signal is obtained based on a phase difference between the reflected signal respectively received by the receive antenna 0 and the receive antenna 1. Further, an incoming direction of the reflected signal may be determined based on the transverse incoming direction and the longitudinal incoming direction.

In another implementation, there are at least two transmit antennas, and there are at least two receive antennas. Two transmit antennas, namely, the transmit antenna 0 and the transmit antenna 1, and two receive antennas, namely, the receive antenna 0 and the receive antenna 1, are used as an example. It is assumed that a line (imaginary) between the transmit antenna 0 and the transmit antenna 1 is located in the longitudinal direction, and a line (imaginary) between the receive antenna 0 and the receive antenna 1 is located in the transverse direction. After transmit signals of the two transmit antennas are respectively reflected by the reflector (the object or the human body), at least one receive antenna receives the reflected signal. The millimeter wave radar apparatus 300 may calculate the longitudinal incoming direction (for example, the horizontal incoming direction) of a signal after the transmit signal is reflected (in this case, the signal may also be referred to as the reflected signal) based on the phase difference of the signals transmitted by the transmit antenna 0 and the transmit antenna 1 respectively arriving at the same receive antenna. A transverse incoming direction (for example, a horizontal incoming direction) of the reflected signal is obtained based on the phase difference between the reflected signals respectively received by the receive antenna 0 and the receive antenna 1. Further, an incoming direction of the reflected signal may be determined based on the transverse incoming direction and the longitudinal incoming direction.

In another implementation, there are at least three transmit antennas, and there is at least one receive antenna. Three transmit antennas, namely, the transmit antenna 0, the transmit antenna 1, and the transmit antenna 2, and one receive antenna, namely, the receive antenna 0, are used as an example. The transmit antenna 0, the transmit antenna 1, and the transmit antenna 2 are distributed in a triangle. It is assumed that a line (imaginary) between the transmit antenna 0 and the transmit antenna 1 is located in the transverse direction (for example, the horizontal direction), and a line (imaginary) between the transmit antenna 0 and the transmit antenna 2 is located in the longitudinal direction. After transmit signals of the transmit antenna 0, the transmit antenna 1, and the transmit antenna 2 are respectively reflected by the reflector (the object or the human body), the receive antenna 0 receives the reflected signal. The millimeter wave radar apparatus 300 may calculate the transverse incoming direction (for example, the horizontal incoming direction) of a signal after the transmit signal is reflected (in this case, the signal may also be referred to as the reflected signal) based on the phase difference between the signals transmitted by the transmit antenna 0 and the transmit antenna 1 respectively arriving at the same receive antenna. The longitudinal incoming direction (for example, the plumb incoming direction) of the signal after the transmit signal is reflected (which may also be referred to as the reflected signal) is calculated based on the phase difference between signals transmitted by the transmit antenna 0 and the transmit antenna 2 arriving at the same receive antenna.

It may be understood that the millimeter wave radar apparatus 300 may further include other modules, such as a storage module, a communication module, and a processing module. For other structures, refer to descriptions of related modules in the vehicle-mounted terminal 100 shown in FIG. 2. Details are not described herein again. In some other embodiments, the millimeter wave radar apparatus 300 may alternatively be integrated into the vehicle-mounted terminal 100. This is not limited in this embodiment of this disclosure.

The mobile terminal 400 has a UWB module, configured to implement a function of a UWB tag. The UWB module of the mobile terminal 400 includes at least one UWB antenna, configured to receive or send a UWB signal. For another structure of the mobile terminal 400, refer to the structure of the vehicle-mounted terminal 100. It may be understood that the mobile terminal 400 may include more or fewer components than the vehicle-mounted terminal 100, or combine some components, or split some components, or have different component arrangements. A structure of the mobile terminal 400 is not limited in this embodiment of this disclosure.

The following describes in detail the technical solutions provided in disclosed embodiments with reference to the accompanying drawings.

Figure 5A:
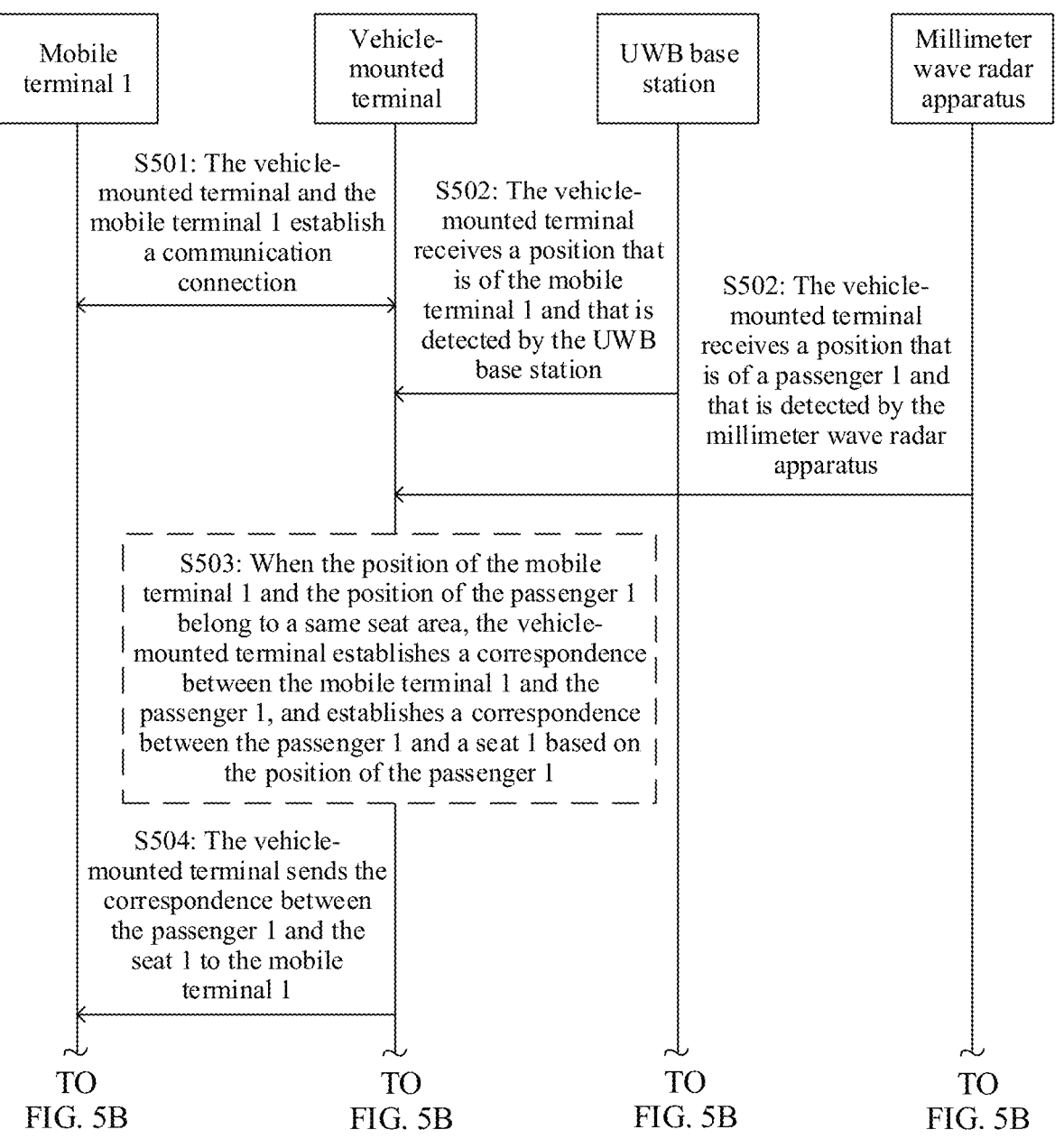

FIG. 5(A) and FIG. 5(B) are a schematic flowchart of an in-vehicle application transfer method according to an embodiment of this disclosure. As shown in FIG. 5(A) and FIG. 5(B), the method includes the following steps.

S501: A vehicle-mounted terminal and a mobile terminal 1 establish a communication connection.

After a passenger carrying the mobile terminal 1 enters an automobile, the mobile terminal 1 and the vehicle-mounted terminal establish the communication connection. The communication connection may be a wired connection or a wireless connection. The wireless connection may be, for example, a Bluetooth connection (a classic connection or a BLE connection), a Wi-Fi connection, or the like.

In an example, the mobile terminal 1 and the vehicle-mounted terminal establish the communication connection for the first time, and the vehicle-mounted terminal requires a vehicle owner to perform authorization. For example, the vehicle-mounted terminal displays a related authorization interface or plays a voice prompt, and the vehicle owner performs an operation (for example, fingerprint authentication, facial authentication, or password authentication) on the authorization interface or sends a related voice command. Alternatively, the vehicle-mounted terminal sends an authorization request to the mobile terminal 1 (for example, a mobile phone of the vehicle owner) bound to the vehicle owner, and the vehicle owner may alternatively perform remote authorization on the mobile terminal 1 by using the mobile terminal (for example, the mobile phone of the vehicle owner) bound to the automobile. In another example, the mobile terminal 1 and the vehicle-mounted terminal establish the communication connection not for the first time. In this case, when the mobile terminal 1 approaches the vehicle-mounted terminal, the mobile terminal 1 and the vehicle-mounted terminal automatically establish the communication connection, and automatically complete identity authentication.

S502: The vehicle-mounted terminal receives a position that is of the mobile terminal 1 and that is detected by a UWB base station and receives a position that is of a passenger 1 and that is detected by a millimeter wave radar apparatus.

The vehicle-mounted terminal is connected to the UWB base station; or the vehicle-mounted terminal includes a UWB module, and the UWB module of the vehicle-mounted terminal may be configured to implement a function of the UWB base station. Herein, an example in which the vehicle-mounted terminal is connected to the UWB base station is used for description.

The vehicle-mounted terminal is further connected to the millimeter wave radar apparatus; or the vehicle-mounted terminal further includes a millimeter wave radar module, and the millimeter wave radar module of the vehicle-mounted terminal may be configured to measure a position of a passenger in the vehicle, an action of the passenger, and the like. Herein, an example in which the vehicle-mounted terminal is connected to the millimeter wave radar apparatus is used for description.

In some embodiments, when the mobile terminal 1 and the vehicle-mounted terminal establish the communication connection, the mobile terminal 1 sends a UWB ranging request by using a UWB module of the mobile terminal 1, to request the UWB base station in the vehicle to measure the position of the mobile terminal 1. Alternatively, the UWB base station in the vehicle continuously sends the UWB measurement request. When receiving the UWB measurement request sent by the UWB base station, the mobile terminal 1 sends a UWB signal, which is used by the UWB base station to measure the position of the mobile terminal 1. Then, the UWB base station sends the measured position of the mobile terminal 1 to the vehicle-mounted terminal.

In addition, the millimeter wave radar apparatus in the vehicle monitors the position of the passenger in the vehicle in real time and sends the detected position of the passenger to the vehicle-mounted terminal. Optionally, the millimeter wave radar apparatus may alternatively monitor the action of the passenger, for example, putting down the mobile terminal 1 or picking up the mobile terminal 1. Optionally, the millimeter wave radar apparatus may alternatively track the position of the passenger in real time, to determine whether the passenger changes a seat, or whether the passenger has returned to the vehicle after leaving the vehicle.

S503: When the position of the mobile terminal 1 and the position of the passenger 1 belong to a same seat area, the vehicle-mounted terminal establishes a correspondence between the mobile terminal 1 and the passenger 1 and establishes a correspondence between the passenger 1 and a seat 1 based on the position of the passenger 1.

In some embodiments, when the position of the mobile terminal 1 and the position of the passenger 1 belong to the same seat area, it may be determined that the mobile terminal 1 is a device carried by the passenger 1, and the correspondence between the mobile terminal 1 and the passenger 1 is established. It may be understood that, when the passenger 1 just enters the vehicle, the passenger 1 carries the mobile terminal 1. Therefore, the position that is of the mobile terminal 1 and that is detected by the UWB base station and the position that is of the passenger 1 and that is detected by the millimeter wave radar apparatus coincide with each other (or belong to the same seat area). Therefore, the correspondence between the mobile terminal 1 and the passenger 1 is established. Subsequently, a display of the vehicle-mounted terminal to which an application running on the mobile terminal 1 is to be transferred is determined based on the position of the passenger 1. Optionally, after the passenger 1 enters the vehicle, the mobile terminal 1 may be placed on another seat, or the like, that is, subsequently, the position of the mobile terminal 1 and the position of the passenger 1 may not coincide with each other (or do not belong to the same seat area). In this case, the vehicle-mounted terminal no longer changes the correspondence between the mobile terminal 1 and the passenger 1 based on the position of the mobile terminal 1.

In addition, the vehicle-mounted terminal may monitor the position of the passenger 1 in real time by using the millimeter wave radar apparatus, and then determine, based on the position of the passenger 1, a seat corresponding to the passenger 1. For example, if a current position of the passenger 1 corresponds to the seat 1, the correspondence between the passenger 1 and the seat 1 is established. It may be understood that, in this application, it is determined, based on a real-time position of the passenger 1, that the application on the mobile terminal 1 is transferred to a display corresponding to the real-time position of the passenger 1, so that the passenger 1 can continue to use the application on the mobile terminal 1, for example, watch a video played by a video application, or operate the application running on the mobile terminal 1, or the like. Therefore, the millimeter wave radar apparatus monitors the position of the passenger 1 in real time, and when the position of the passenger 1 changes, the vehicle-mounted terminal determines a corresponding seat based on a changed position of the passenger 1. For example, when it is detected that the position of the passenger 1 changes to a seat 2, the correspondence between the passenger 1 and the seat 1 is changed to a correspondence between the passenger 1 and the seat 2.

S504: The vehicle-mounted terminal sends the correspondence between the passenger 1 and the seat 1 to the mobile terminal 1.

Correspondingly, the mobile terminal 1 receives the correspondence that is between the passenger 1 and the seat 1 and that is sent by the vehicle-mounted terminal.

S505: When it is detected that a preset condition of application transfer is met, the vehicle-mounted terminal sends an indication message of the application transfer to the mobile terminal 1.

In some embodiments, the preset condition of the application transfer includes detecting that the passenger 1 performs a preset action. For example, when the mobile terminal 1 is a mobile phone, the preset action may be, for example, an action of putting down the mobile phone by the passenger 1, or the passenger 1 placing the mobile phone on a mobile phone holder. For another example, when the mobile terminal 1 is a smartwatch, and the smartwatch is worn on a wrist of the passenger 1, the preset action may be, for example, that the passenger 1 places the wrist on a steering wheel (driving), or that the passenger 1 does not lift the wrist. For example, after detecting the passenger 1, the millimeter wave radar apparatus continuously detects a status of the passenger 1 (including the action, a position change, and the like of the passenger 1). When the millimeter wave radar apparatus detects the action that the passenger 1 puts down the mobile terminal 1, the vehicle-mounted terminal sends the indication message of the application transfer to the mobile terminal 1.

In some other embodiments, after the vehicle-mounted terminal determines the correspondence between the passenger 1 and the seat 1, the vehicle-mounted terminal may display a user prompt on a display corresponding to the seat 1 or play a voice prompt on the vehicle-mounted terminal, to ask whether a user agrees to perform application transfer. After an operation of agreeing with the application transfer by the user on the display is received, or a voice input by the user to agree with the application transfer is received, the vehicle-mounted terminal sends the indication message of the application transfer to the mobile terminal 1. In this example, that the preset condition of the application transfer is met includes receiving the operation of agreeing with the application transfer by the user on the display, receiving the voice input by the user to agree with the application transfer, or the like.

In yet some embodiments, if the user (for example, the passenger 1 or the vehicle owner) enables an automatic transfer function of the application on the vehicle-mounted terminal, the vehicle-mounted terminal sends the indication message of the application transfer to the mobile terminal 1. In this example, the preset condition of the application transfer includes that the user enables the automatic transfer function of the application on the vehicle-mounted terminal in advance.

It should be noted that step S505 may be performed after step S504, step S505 may be performed before step S504, or step S505 and step S504 may be performed at the same time. This is not limited in this embodiment of this disclosure.

It should be further noted that "application transfer" in this embodiment of this application may also be expressed as "interface transfer", "screen sharing", "combined display", "screen collaboration", "component collaboration", "distributed display", "page separation", "collaborative interaction", "screen splicing", "collaborative display", and other words. In conclusion, a definition of "application transfer" in this embodiment of this application does not constitute a special limitation on the technical solutions provided in this embodiment of this disclosure.

S506: The mobile terminal 1 requests, from the vehicle-mounted terminal based on the correspondence between the passenger 1 and the seat 1, a hardware capability corresponding to the seat 1.

The hardware capability corresponding to the seat 1 includes but is not limited to an identifier of the display corresponding to the seat 1, a display parameter (for example, a display resolution) of the display, an identifier of a camera corresponding to the seat 1, and a video parameter (for example, a video output mode, a capture rate, or a frame rate), an identifier and an audio parameter (for example, an audio coding mode, a bit rate, a sampling rate, or a channel) of an audio device corresponding to the seat 1. The display corresponding to the seat 1 is, for example, a display in front of the seat 1. The camera corresponding to the seat 1 is, for example, a camera in front of the seat 1, or a camera that can capture an image of an area in which the seat 1 is located. An audio device corresponding to the seat 2 is, for example, an audio device that can provide a specific audio playing effect for a passenger in the area in which the seat 1 is located, and/or a device that collects audio of a passenger in the area in which the seat 1 is located. In some examples, the audio device corresponding to the seat 1 is not necessarily deployed in the area in which the seat 1 is located. For example, when the seat 1 is any seat in a rear row, the audio device corresponding to the seat 1 may be one or two audio devices located in the rear row near vehicle doors at two sides.

In some embodiments, when receiving the indication message of the application transfer sent by the vehicle-mounted terminal, the mobile terminal 1 requests, from the vehicle-mounted terminal based on the correspondence between the passenger 1 and the seat 1, the hardware capability corresponding to the seat 1. Optionally, in some examples, when receiving the indication message of the application transfer sent by the vehicle-mounted terminal, the mobile terminal 1 may alternatively display the user prompt to ask whether the passenger 1 agrees with the application transfer. After receiving an indication that the passenger 1 agrees with the application transfer, the mobile terminal 1 requests the hardware capability corresponding to the seat 1 from the vehicle-mounted terminal.

In still some embodiments, the passenger 1 enables the automatic transfer function of the application on the mobile terminal 1. In this case, in step S504, when the mobile terminal 1 receives the correspondence between the passenger 1 and the seat 1 sent by the vehicle-mounted terminal, the mobile terminal 1 may alternatively directly request the hardware capability corresponding to the seat 1 from the vehicle-mounted terminal. That is, after step S504, step S505 is not performed, and step S506 is directly performed.

S507: The vehicle-mounted terminal returns the hardware capability corresponding to the seat 1 to the mobile terminal 1.

Correspondingly, the mobile terminal 1 receives the hardware capability that corresponds to the seat 1 and that is returned by the vehicle-mounted terminal.

Optionally, when receiving the request that is for the hardware capability corresponding to the seat 1 and that is sent by the mobile terminal 1, the vehicle-mounted terminal may display the user prompt to prompt the user whether to agree the mobile terminal 1 to invoke the hardware capability corresponding to the seat 1. In some examples, the vehicle-mounted terminal may display user prompt information or a voice prompt on a display in front of a driver, to request authorization of the driver. Alternatively, the vehicle-mounted terminal may display the user prompt information on the display in front of the seat 1, to request authorization of a passenger in front of the seat 1. Alternatively, the vehicle-mounted terminal may send the user prompt information to the mobile terminal (for example, the mobile phone of the vehicle owner) bound to the vehicle owner, to request authorization of the vehicle owner. A user prompt manner is not limited in this embodiment of this disclosure.

S508: In a process of running an application A, the mobile terminal 1 invokes the hardware capability corresponding to the seat 1.

In some embodiments, both the mobile terminal 1 and the vehicle-mounted terminal may be equipped with a Harmony operating system (HarmonyOS), and cross-device application transfer is implemented based on a distributed soft bus technology of the Harmony operating system. A distributed soft bus provides a unified distributed communication capability for interconnection and interworking between a plurality of terminals and creates a condition for insensible discovery and zero-wait transmission between terminals.

For example, after the mobile terminal receives the hardware capability corresponding to the seat 1, and in the process of running the application A, the mobile terminal invokes the hardware capability corresponding to the seat 1 in the vehicle-mounted terminal. For example, the mobile terminal invokes the display corresponding to the seat 1 to display an application interface of the application A, and/or invokes the camera corresponding to the seat 1 to capture the image of the area in which the seat 1 is located, and/or invokes the audio device corresponding to the seat 1 to play a current application. It may be understood that, when the passenger 1 is in the seat 1, the interface of the application A running on the mobile terminal 1 is displayed on the display (a display closest to the passenger 1) corresponding to the seat 1, so that the passenger 1 can view and perform a related application operation. The camera corresponding to the seat 1 can capture the image of the area (including the passenger 1) in which the seat 1 is located, and the passenger 1 does not need to lift the mobile terminal 1 or specially adjust a posture, and this improves application use experience of the passenger 1. The audio device corresponding to the seat 1 can ensure audio experience of the passenger 1 when the passenger 1 is in the seat 1.

In conclusion, as the passenger 1 enters the vehicle, an application on the mobile terminal 1 used by the passenger 1 may be automatically transferred to the vehicle-mounted terminal, and specifically transferred to hardware corresponding to a seat in which the passenger 1 is in the vehicle-mounted terminal, to bring immersive application use experience to the passenger 1.

In some other embodiments, after the mobile terminal 1 transfers the application A to the vehicle-mounted terminal, the mobile terminal 1 may display an interface prompt indicating that the application A is transferred to the vehicle-mounted terminal or play a voice prompt indicating that the application A is transferred to the vehicle-mounted terminal. Then, the mobile terminal 1 no longer displays the interface of the application A. Optionally, the mobile terminal 1 may alternatively turn off the screen after preset duration (for example, 1 minute). This is not limited in this embodiment of this disclosure.

It should be further noted that step S506 to step S508 describe a schematic flowchart in which the mobile terminal 1 invokes the hardware capability corresponding to the seat 1 on the vehicle-mounted terminal to transfer the application on the mobile terminal 1 to the vehicle-mounted terminal. In some other embodiments, another technical solution may also be used to transfer the application on the mobile terminal 1 to the vehicle-mounted terminal.

Figure 6:
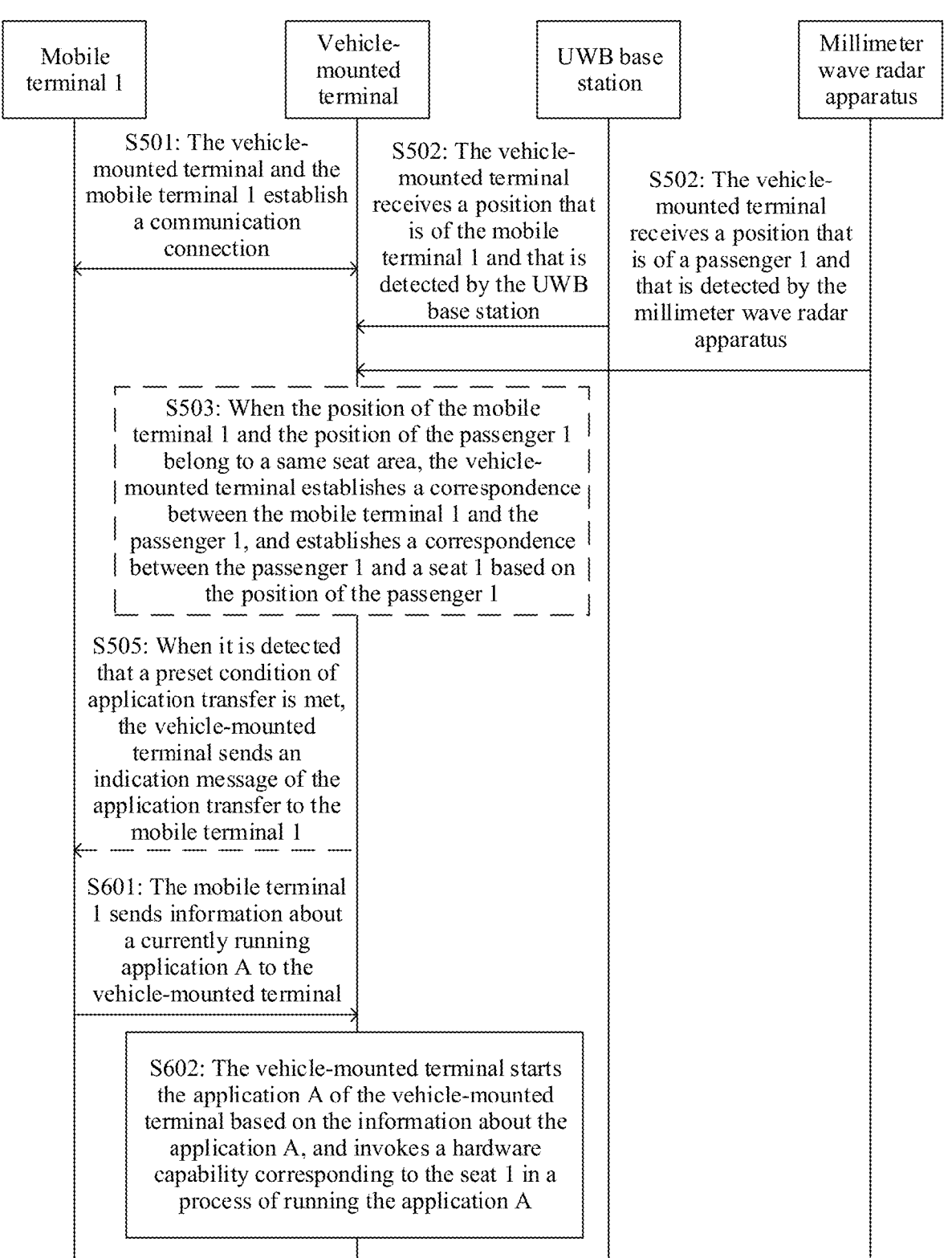
FIG. 6 is a schematic flowchart of another application transfer method according to an embodiment of this disclosure.

For example, step S506 to step S508 may be replaced with step S601 and step S602. As shown in FIG. 6, FIG. 6 is a schematic flowchart of another application transfer method according to an embodiment of this application. The method includes the following steps: step S501 to step S503, step S505, and step S601 and step S602.

For related content in step S501 to step S503 and step S505, refer to the description of related content in the foregoing description. Details are not described herein again.

S601: A mobile terminal 1 sends information about a currently running application A to a vehicle-mounted terminal.

Correspondingly, the vehicle-mounted terminal receives the information about the application A sent by the mobile terminal 1.

S602: The vehicle-mounted terminal starts the application A of the vehicle-mounted terminal based on the information about the application A. In addition, in a process of running the application A, the vehicle-mounted terminal invokes a hardware capability corresponding to a seat 1.

The information about the application A includes one or more of an identifier, a running status, and a background snapshot of the application A.

In some embodiments, the application A is pre-installed on the vehicle-mounted terminal. When receiving the identifier of the application A sent by the mobile terminal 1, the vehicle-mounted terminal starts the application A on the vehicle-mounted terminal. Optionally, the vehicle-mounted terminal further receives the running status of the application A sent by the mobile terminal 1. In this case, the application A on the vehicle-mounted terminal continues to run in the running status of the application A on the mobile terminal 1, so that the application A is seamlessly transferred from the mobile terminal 1 to the vehicle-mounted terminal for running. Optionally, the vehicle-mounted terminal may alternatively receive the background snapshot of the application A sent by the mobile terminal 1. In this case, the vehicle-mounted terminal may directly use the background snapshot of the application A, to accelerate a running rate of the application A and quickly update the running status of the application A.

In addition, in a process in which the vehicle-mounted terminal runs the application A, the vehicle-mounted terminal invokes a hardware capability corresponding to a seat 1. For example, the vehicle-mounted terminal invokes the display corresponding to the seat 1 to display a related application interface of a current application, and/or invokes the camera corresponding to the seat 1 to capture an image of an area in which the seat 1 is located, and/or invokes an audio device corresponding to the seat 1 to play a current application. It may be understood that, when a passenger 1 is in the seat 1, an interface of the application A running on the mobile terminal 1 is displayed on the display (a display closest to the passenger 1) corresponding to the seat 1, so that the passenger 1 can view and perform a related application operation. The camera corresponding to the seat 1 can capture the image of the area (including the passenger 1) in which the seat 1 is located, and the passenger 1 does not need to lift the mobile terminal 1 or specially adjust a posture, and this improves application use experience of the passenger 1. The audio device corresponding to the seat 1 can ensure audio experience of the passenger 1 when the passenger 1 is in the seat 1.

In some other embodiments, the application A is not pre-installed on the vehicle-mounted terminal. When the vehicle-mounted terminal receives the identifier of the application A sent by the mobile terminal 1, the vehicle-mounted terminal may download an installation package of the application A from a network, and install and start the application A. For other content, refer to the foregoing description. Details are not described herein again.

In addition, it should be noted that, after the mobile terminal 1 transfers the application A to the vehicle-mounted terminal, the mobile terminal 1 may display an interface prompt indicating that the application A is transferred to the vehicle-mounted terminal, or play a voice prompt indicating that the application A is transferred to the vehicle-mounted terminal. Then, the mobile terminal 1 no longer displays the interface of the application A. Optionally, the mobile terminal 1 may alternatively turn off the screen after preset duration (for example, 1 minute). This is not limited in this embodiment of this disclosure.

In conclusion, a specific process of transferring the application on the mobile terminal 1 to the vehicle-mounted terminal is not limited in this embodiment of this disclosure.

In still some other embodiments, the vehicle-mounted terminal may continuously detect an action of the passenger 1 by using a millimeter wave radar apparatus. When detecting an action of picking up the mobile terminal 1 by the passenger 1, or detecting an action of continuing to operate the mobile terminal 1 by the passenger 1, the vehicle-mounted terminal may transfer the application A from the vehicle-mounted terminal back to the mobile terminal. In some examples, the vehicle-mounted terminal indicates the mobile terminal 1 to end the application transfer. In this case, the mobile terminal 1 does not invoke a hardware capability of the vehicle-mounted terminal, but directly invokes a hardware capability of the mobile terminal 1, so that the application A is transferred back to the mobile terminal 1. In some other examples, the vehicle-mounted terminal may send the information about the application A (the identifier of the application A, a running status at this time, a background service, and the like) on the vehicle-mounted terminal to the mobile terminal 1, and the mobile terminal 1 continues to run the application A, so that the application A is transferred back to the mobile terminal 1. It can be seen that the vehicle-mounted terminal can detect the action of the passenger 1 by using the millimeter wave radar apparatus, and infer an intention of the passenger 1 from the action of the passenger 1 (the application is transferred to the vehicle-mounted terminal, or the application is transferred back to the mobile terminal 1), so as to implement automatic transfer of the application based on the intention.

In still some other embodiments of this disclosure, the vehicle-mounted terminal may continuously detect a position of the passenger 1 by using the millimeter wave radar apparatus. When detecting that the position of the passenger 1 changes, for example, the position of the passenger moves from the seat 1 to a seat 2, the vehicle-mounted terminal may update a correspondence between the passenger 1 and a seat, for example, update a correspondence between the passenger 1 and the seat 1 to a correspondence between the passenger 1 and the seat 2. In some examples, the vehicle-mounted terminal sends the correspondence between the passenger 1 and the seat 2 to the mobile terminal 1. In this case, the mobile terminal 1 requests, from the vehicle-mounted terminal based on the correspondence between the passenger 1 and the seat 2, a hardware capability corresponding to the seat 2. In addition, in a process of running the application A, the vehicle-mounted terminal invokes the hardware capability corresponding to the seat 2. For example, the vehicle-mounted terminal invokes a display corresponding to the seat 2 to display a related application interface of the application A, and/or invokes a camera corresponding to the seat 2 to capture an image of an area in which the seat 2 is located, and/or invokes an audio device corresponding to the seat 2 to play a voice of the application A. It can be seen that, when the passenger 1 changes the seat in a vehicle, the vehicle-mounted terminal automatically transfers the application A on the mobile terminal 1 from hardware corresponding to the seat before a replacement to hardware corresponding to the seat after the replacement, and a user is unaware of the transfer process. This brings the user an immersive application use experience.

In still some embodiments of this disclosure, the vehicle-mounted terminal may continuously detect a position of the passenger 1 by using the millimeter wave radar apparatus. When detecting that the passenger 1 leaves the vehicle, the vehicle-mounted terminal may indicate the mobile terminal 1 to end the application transfer. In some examples, the mobile terminal 1 no longer invokes the hardware capability of the vehicle-mounted terminal, but directly invokes the hardware capability of the mobile terminal 1, so that the application A is transferred back to the mobile terminal 1. In some other examples, the vehicle-mounted terminal may send the information about the application A (the identifier of the application A, a running status at this time, a background service, and the like) on the vehicle-mounted terminal to the mobile terminal 1, and the mobile terminal 1 continues to run the application A, so that the application A is transferred back to the mobile terminal 1.

In still some other embodiments of this disclosure, after leaving the vehicle, the passenger 1 returns to the vehicle within a short time (the seat is changed or the seat is not changed), and the vehicle-mounted terminal may re-establish, based on a position that is of the mobile terminal 1 and that is detected by a UWB base station and the position that is of the passenger 1 and that is detected by the millimeter wave radar apparatus, the correspondence between the mobile terminal 1 and the passenger 1, and a correspondence between the passenger 1 and a seat currently seated, and transfer the application on the mobile terminal to hardware corresponding to the seat. For this process, refer to descriptions of related content in FIG. 5(A) and FIG. 5(B) or FIG. 6. Details are not described herein again.

The following describes the technical solutions provided in disclosed embodiments by using an example in which the mobile terminal is a mobile phone and an application is transferred on different displays of the vehicle-mounted terminal.

Figure 7:
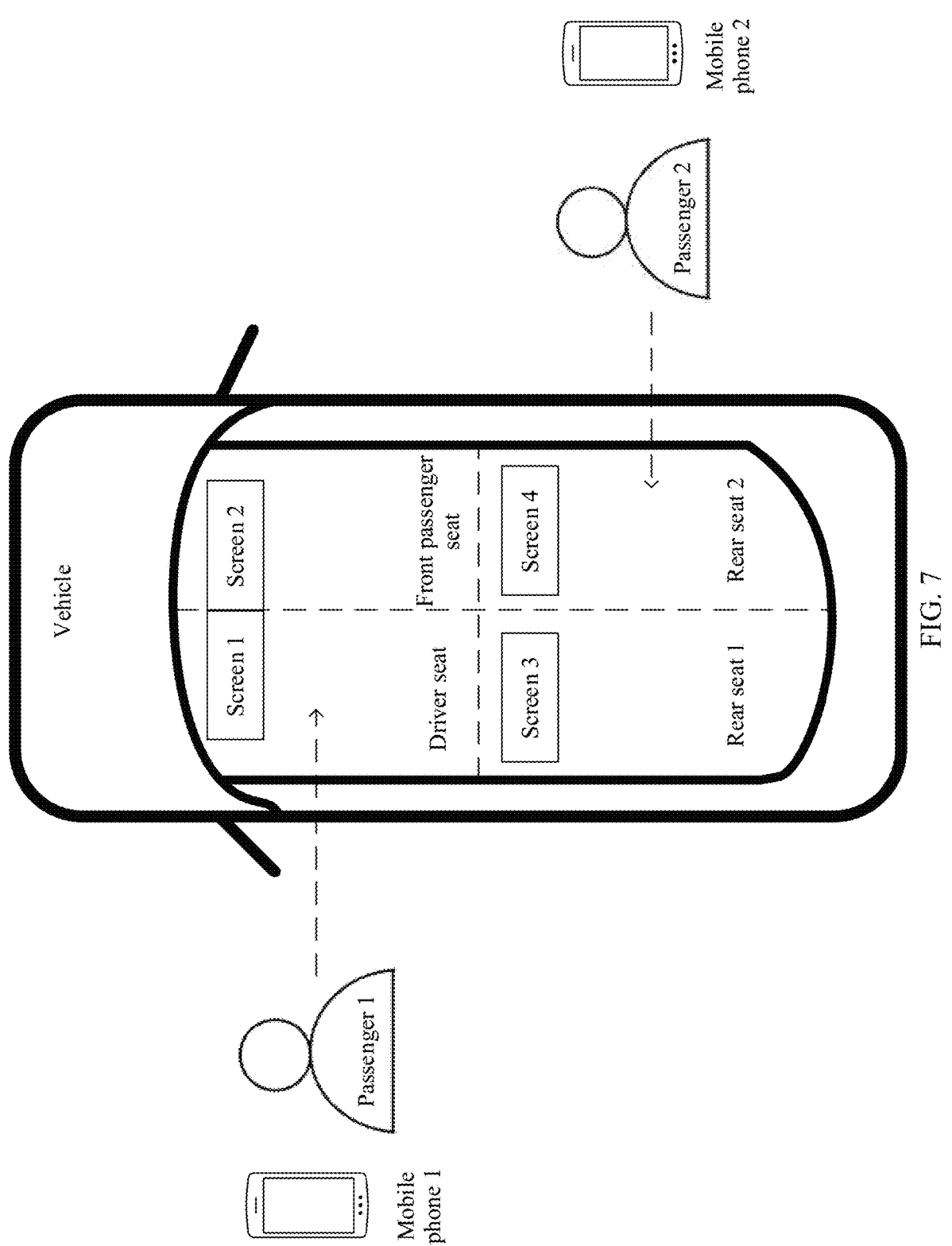
FIG. 7 is a schematic diagram of an application scenario according to an embodiment of this disclosure.

As shown in FIG. 7, when a passenger 1 carrying a mobile phone 1 enters a driver seat of an automobile, the mobile phone 1 establishes a communication connection to a vehicle-mounted terminal in the automobile. In addition, the mobile phone 1 is configured with a UWB module that can implement a function of a UWB tag. In this case, a UWB base station (not shown in the figure) in the automobile may measure a position of the mobile phone 1. A millimeter wave radar apparatus in the automobile (not shown in the figure) may detect a position of the passenger 1. In addition, the position of the passenger 1 and the position of the mobile phone 1 coincide with each other and belong to a same seat area. The vehicle-mounted terminal establishes a correspondence between the mobile phone 1 and the passenger 1. Further, the vehicle-mounted terminal establishes a correspondence between the passenger 1 and the driver seat. The millimeter wave radar apparatus continuously detects an action of the passenger 1. When it is detected that the passenger 1 puts down the mobile phone 1 (for example, the mobile phone 1 is placed on a front passenger seat), the vehicle-mounted terminal may notify the mobile phone 1 to transfer an application (for example, a call application or a navigation application) running on the mobile phone 1 to a display (for example, a screen 1) in front of the driver seat.

Optionally, the millimeter wave radar apparatus in the automobile continuously detects the position and action of the passenger 1. When the millimeter wave radar apparatus detects that the passenger 1 picks up the mobile phone 1, the vehicle-mounted terminal may transfer an application displayed on the display (for example, the screen 1) in front of the driver seat back to the mobile phone 1.

When a passenger 2 carrying a mobile phone 2 enters a rear seat 2, similar to the previous step, the vehicle-mounted terminal establishes a correspondence between the passenger 2 and the mobile phone 2 and establishes a correspondence between the passenger 2 and the rear seat 2. In this case, when it is detected that the passenger 2 puts down the mobile phone 2 (for example, the mobile phone 2 is placed in a pocket of the clothes), the vehicle-mounted terminal may notify the mobile phone 2 to transfer an application (for example, a call application or a navigation application) running on the mobile phone 2 to a display (for example, a screen 4) in front of the rear seat 2.

The millimeter wave radar apparatus in the automobile continuously detects positions and actions of the passenger 1 and the passenger 2.

Figure 8:
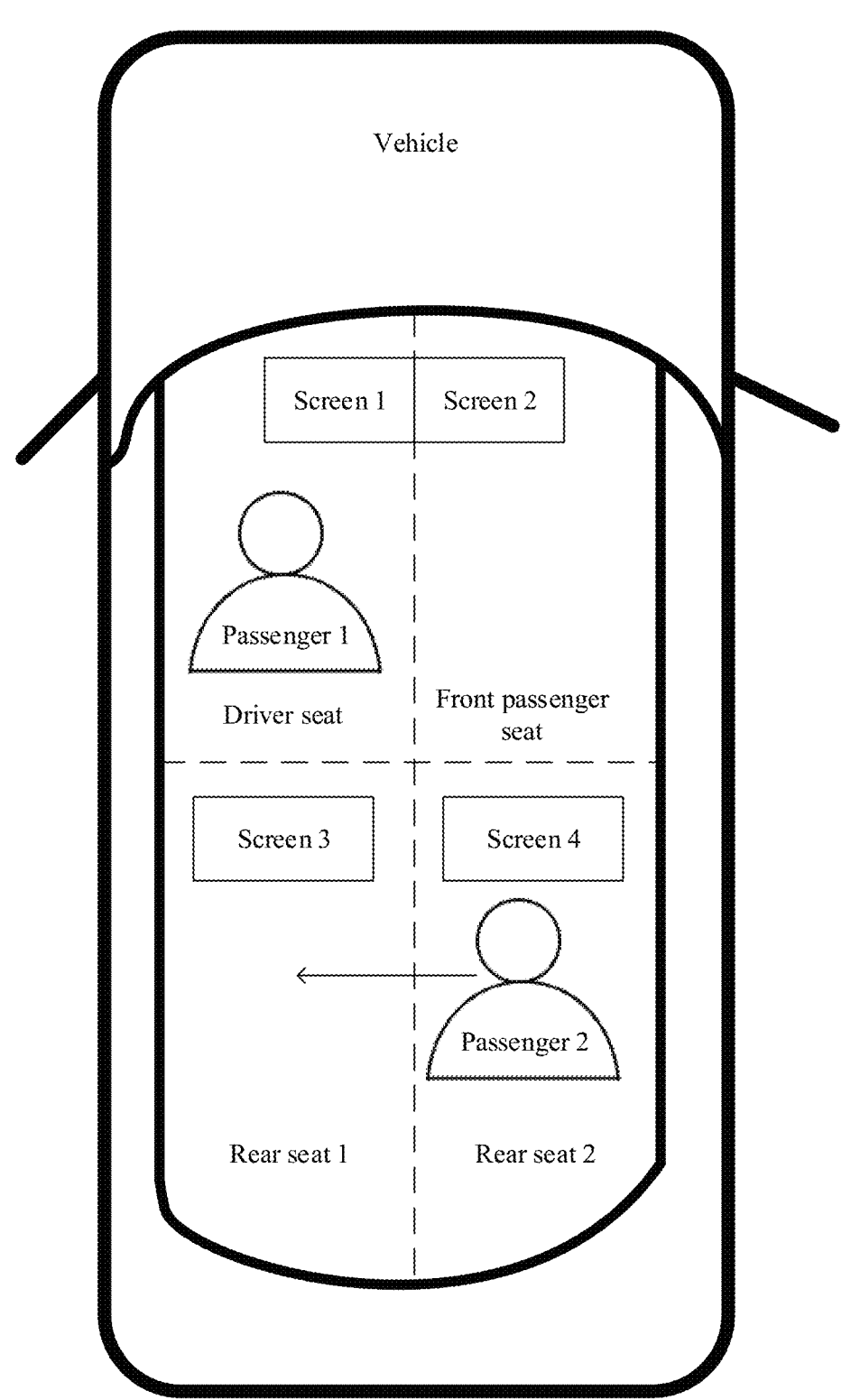
FIG. 8 is a schematic diagram of another application scenario according to an embodiment of this disclosure.

As shown in FIG. 8, when the millimeter wave radar apparatus detects that the passenger 2 moves from the rear seat 2 to a rear seat 1, an application displayed on the display (such as the screen 4) in front of the rear seat 2 of the vehicle-mounted terminal is transferred to a display (for example, a screen 3) in front of the rear seat 1.

Figure 9:
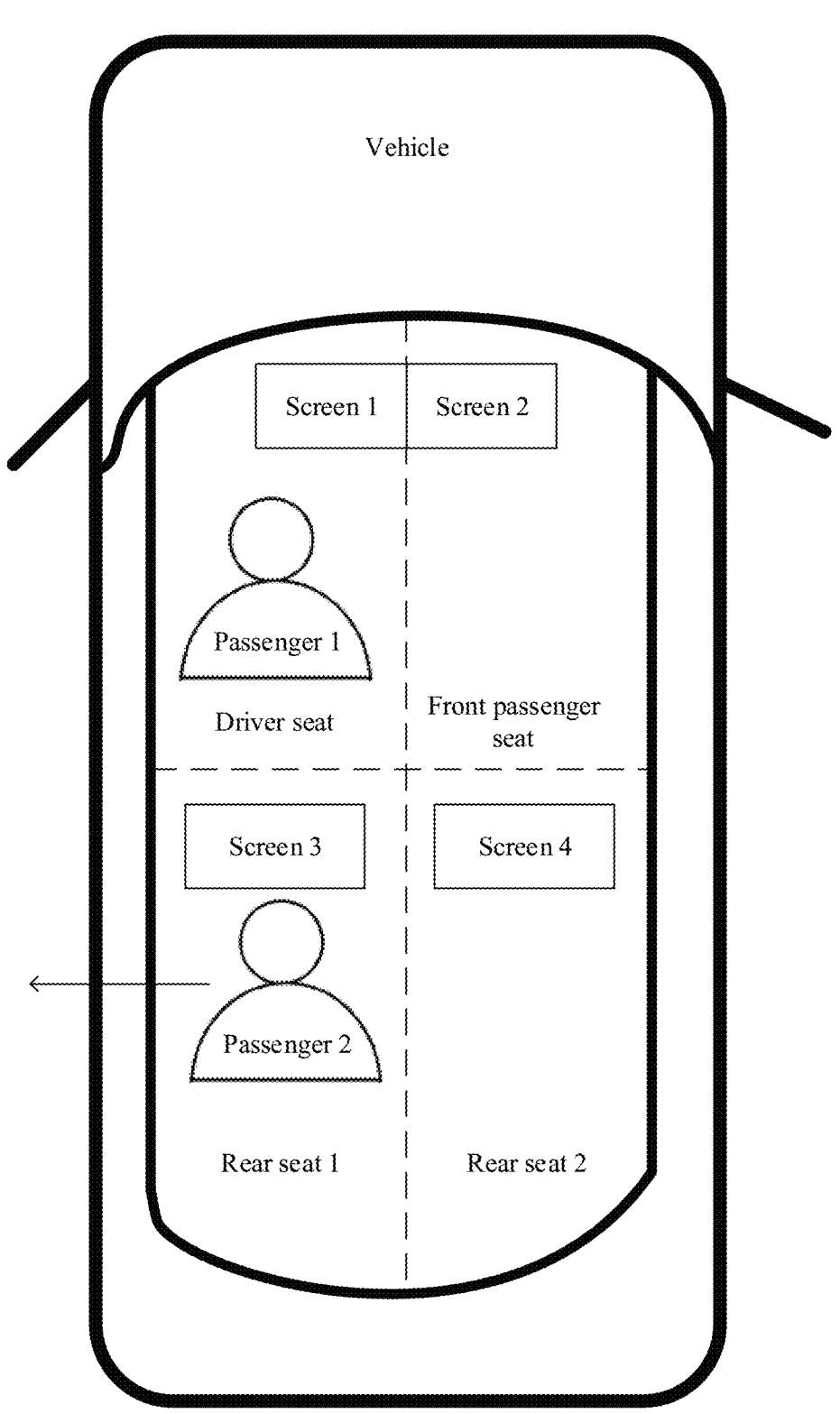
FIG. 9 is a schematic diagram of still another application scenario according to an embodiment of this disclosure.
Figure 10:
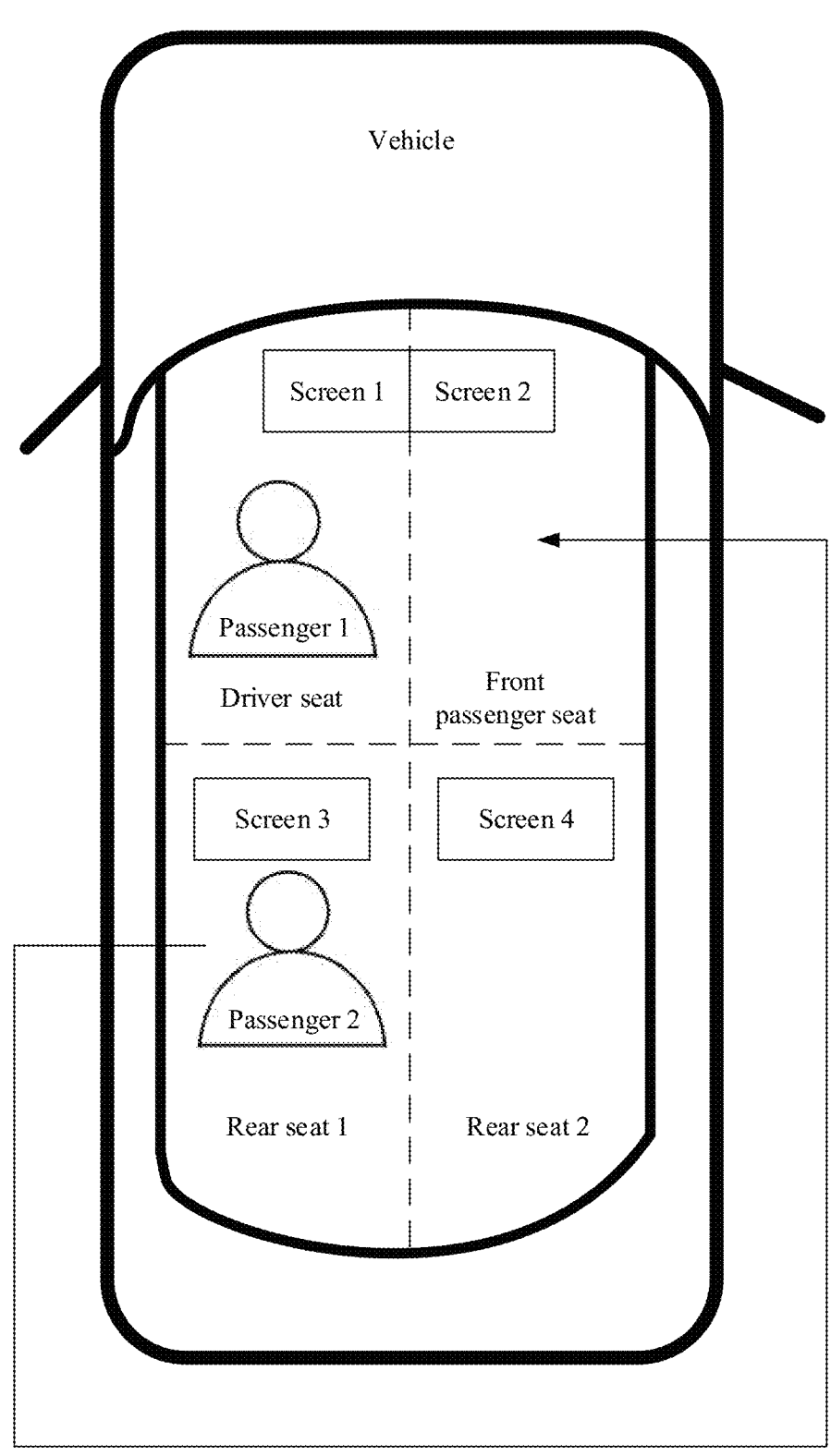
FIG. 10 is a schematic diagram of yet another application scenario according to an embodiment of this disclosure.

As shown in FIG. 9, when the millimeter wave radar apparatus detects that the passenger 2 leaves the vehicle from the rear seat 1, the vehicle-mounted terminal may transfer an application displayed on the display (for example, the screen 3) in front of the rear seat 1 back to the mobile phone 2. In some examples, as shown in FIG. 10, after leaving the vehicle from the rear seat 1, the passenger 2 returns to the front passenger seat. In this case, when the passenger 2 enters the front passenger seat, the vehicle-mounted terminal re-establishes the correspondence between the passenger 2 and the mobile phone 2 and the correspondence between the passenger 2 and the front passenger seat based on a position that is of the mobile phone 2 and that is detected by a UWB base station and a position that is of the passenger 2 and that is detected by a millimeter wave radar apparatus. In this case, the vehicle-mounted terminal may notify the mobile phone 2 to transfer the application (for example, the call application or the navigation application) running on the mobile phone 2 to a display (for example, a screen 2) in front of the front passenger seat.

In still some examples, if the millimeter wave radar apparatus is also disposed on the outside of the automobile, when the passenger 2 returns to the front passenger seat within preset duration (for example, within 3 minutes) after leaving the vehicle from the rear seat 1, the millimeter wave radar apparatus on the outside of the automobile may continuously track a position change of the passenger 2, so that the vehicle-mounted terminal may directly transfer the application displayed on the display (such as the screen 3) in front of the rear seat 1 back to the display (such as the screen 2) in front of the front passenger seat.

Figure 11:
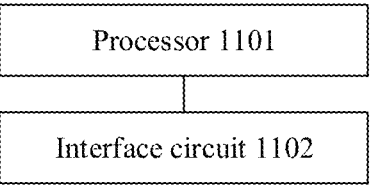
FIG. 11 is a schematic diagram of a structure of a chip system according to an embodiment of this disclosure.

An embodiment of this disclosure further provides a chip system. As shown in FIG. 11, the chip system includes at least one processor 1101 and at least one interface circuit 1102. The processor 1101 and the interface circuit 1102 may be interconnected through a line. For example, the interface circuit 1102 may be configured to receive a signal from another apparatus (for example, a memory of a vehicle-mounted terminal 100). For another example, the interface circuit 1102 may be configured to send a signal to another apparatus (for example, the processor 1101). For example, the interface circuit 1102 may read instructions stored in the memory and send the instructions to the processor 1101. When the instructions are executed by the processor 1101, an electronic device is enabled to perform the steps performed by the vehicle-mounted terminal 100 in the foregoing embodiment. Certainly, the chip system may further include another discrete component. This is not specifically limited in this embodiment of this disclosure.

An embodiment of this disclosure further provides an apparatus. The apparatus is included in a vehicle-mounted terminal/mobile terminal, and the apparatus has a function of implementing behavior of the vehicle-mounted terminal/mobile terminal in any method in the foregoing embodiments. The function may be implemented by hardware or may be implemented by hardware executing corresponding software. The hardware or the software includes at least one module or unit corresponding to the foregoing function, for example, a detection module or unit, a display module or unit, a determining module or unit, and a calculation module or unit.

An embodiment of this disclosure further provides a computer storage medium, including computer instructions. When the computer instructions are run on an electronic device, the electronic device is enabled to perform any method in the foregoing embodiments.

An embodiment of this application further provides a computer program product. When the computer program product runs on a computer, the computer is enabled to perform any method in the foregoing embodiments.

It may be understood that, to implement the foregoing functions, the foregoing vehicle-mounted terminal/mobile terminal and the like include corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this disclosure. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present disclosure.

In embodiments of this disclosure, functional modules of the vehicle-mounted terminal/mobile terminal and the like may be obtained through division based on the foregoing method embodiments. For example, functional modules may be obtained through division in one-to-one correspondence with the functions, or two or more functions may be integrated into one processing module. The integrated module may be implemented in a form of hardware or may be implemented in a form of a software function module. It should be noted that in embodiments of the present invention, module division is an example, and is merely a logical function division. During actual implementation, another division manner may be used.

Based on descriptions about the foregoing implementations, a person skilled in the art may clearly understand that, for a purpose of convenient and brief description, division into the foregoing function modules is used as an example for illustration. In actual application, the foregoing functions may be allocated to different function modules and implemented according to a requirement. In other words, an inner structure of an apparatus is divided into different function modules to implement all or some of the functions described above. For a detailed working process of the foregoing system, apparatus, and unit, refer to a corresponding process in the foregoing method embodiments. Details are not described herein again.

Function units in embodiments of this disclosure may be integrated into one processing unit, each of the units may exist alone physically, or two or more units are integrated into one unit. The integrated unit may be implemented in a form of hardware or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the current technology, or all or a part of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

It should be noted that all or some of any steps or features in embodiments of this disclosure may be freely combined, and a combined technical solution also falls within the scope of this disclosure. The technical solutions in this disclosure are not limited to a vehicle, and may be applied to any means of transportation (for example, a train or an airplane).

The foregoing descriptions are merely specific implementations and are not intended to limit the protection scope of this disclosure. Any variation or replacement within the technical scope disclosed in this disclosure shall fall within the protection scope of the accompanying claims.

What is claimed is:

1. A vehicle-mounted terminal, comprising:
at least two displays;
a receiver configured to receive a first position of a mobile terminal received from an ultra-wideband (UWB) base station and receive a second position corresponding to a first passenger space received from a millimeter wave radar apparatus, the vehicle-mounted terminal being further configured to:
when the first position and the second position correspond to a common area, establish a first correspondence between the mobile terminal and the first passenger space, and when the second position corresponding to the first passenger corresponds to an area of a first seat, establish a second correspondence between the first passenger space and the first seat; and
send the second correspondence to the mobile terminal; and
the mobile terminal is configured to transfer, based on the second correspondence, a first application running on the mobile terminal to a first display on the vehicle-mounted terminal.

2. The vehicle-mounted terminal according to claim 1, wherein:
the vehicle-mounted terminal is further configured to send a first message to the mobile terminal when a first preset condition is met; and
the mobile terminal transfers, based on the second correspondence, a first application running on the mobile terminal to a first display on the vehicle-mounted terminal comprises:
the mobile terminal requests information about the first display corresponding to the first seat from the vehicle-mounted terminal; and
the mobile terminal invokes, based on the information about the first display, the first display to display an interface of the first application running on the mobile terminal.

3. The vehicle-mounted terminal according to claim 1, wherein:
the vehicle-mounted terminal is further configured to send a first message to the mobile terminal when a first preset condition is met; and
the mobile terminal transfers, based on the second correspondence, a first application running on the mobile terminal to a first display on the vehicle-mounted terminal comprises:
sending, by the mobile terminal to the vehicle-mounted terminal, information about the first application running on the mobile terminal; and
the vehicle-mounted terminal starts the first application on the vehicle-mounted terminal based on the information about the first application and invokes, based on the second correspondence, the first display to display an interface of the first application.

4. The vehicle-mounted terminal according to claim 1, wherein: the vehicle-mounted terminal is further configured to receive a second message that meets a first preset condition and that is sent by the millimeter wave radar apparatus, wherein the first preset condition comprises that the millimeter wave radar apparatus detects movement of the mobile terminal.

5. The vehicle-mounted terminal according to claim 1, wherein:
the mobile terminal is further configured to terminate transferring the first application to the first display when a second preset condition is met; or
the vehicle-mounted terminal is further configured to terminate transferring the first application to the first display when a second preset condition is met.

6. The vehicle-mounted terminal according to claim 5, wherein:
the vehicle-mounted terminal is further configured to receive a third message that meets the second preset condition and that is sent by the millimeter wave radar apparatus, wherein the second preset condition comprises that the millimeter wave radar apparatus detects an action of a change in position of the mobile terminal.

7. The vehicle-mounted terminal according to claim 1, wherein:
the vehicle-mounted terminal is further configured to establish a third correspondence between the first passenger space and the second seat when the second position of the first passenger space corresponds to an area of a second seat and to send the third correspondence to the mobile terminal; and
the mobile terminal is configured to transfer, based on the third correspondence, the first application displayed on the first display of the vehicle-mounted terminal to a second display of the vehicle-mounted terminal, wherein the second display is a display corresponding to the second seat.

8. An in-vehicle application transfer method applied to a vehicle-mounted terminal, the method comprising:
separately establishing a wired or wireless connection to each of a mobile terminal, a UWB base station, and a millimeter wave radar apparatus, the vehicle-mounted terminal comprising at least two displays;
receiving, by the vehicle-mounted terminal, a first position of the mobile terminal from the UWB base station and receiving a second position of a first passenger space from the millimeter wave radar apparatus;
when the first position and the second position belong to a same seat area, establishing, by the vehicle-mounted terminal, a first correspondence between the mobile terminal and the first passenger space, and when the second position of the first passenger corresponds to an area of a first seat, establishing, by the vehicle-mounted terminal, a second correspondence between the first passenger space and the first seat; and
sending, by the vehicle-mounted terminal, the second correspondence to the mobile terminal; and
transferring, by the mobile terminal, a first application running on the mobile terminal to a first display on the vehicle-mounted terminal.

9. The method according to claim 8, further comprising:
sending, by the vehicle-mounted terminal, a first message to the mobile terminal when a first preset condition is met, wherein the first message notifies the mobile terminal to start application transfer;
receiving a first request sent by the mobile terminal, wherein the first request requests information about the first display corresponding to the first seat; and
returning to the mobile terminal the information about the first display corresponding to the first seat, wherein the information about the first display invokes the first display of the vehicle-mounted terminal to display an interface of the first application running on the mobile terminal.

10. The method according to claim 8, further comprising: sending, by the vehicle-mounted terminal, a first message to the mobile terminal when a first preset condition is met, wherein the first message notifies the mobile terminal to start application transfer;

receiving, by the vehicle-mounted terminal, information about the first application that is sent by the mobile terminal; and starting, by the vehicle-mounted terminal, the first application on the vehicle-mounted terminal based on the information about the first application, and invoking, based on the second correspondence, the first display to display an interface of the first application.

11. The method according to claim 8, further comprising: receiving, by the vehicle-mounted terminal from the millimeter wave radar apparatus, a second message that meets a first preset condition, wherein the first preset condition comprises information that the millimeter wave radar apparatus detects a change in position of the mobile terminal.

12. The method according to claim 8, further comprising: when a second preset condition is met, stopping, by the vehicle-mounted terminal, transferring the first application on the mobile terminal to the first display on the vehicle-mounted terminal; or instructing, by the vehicle-mounted terminal, the mobile terminal to stop transferring the first application to the first display on the vehicle-mounted terminal.

13. The method according to claim 12, further comprising:

receiving, by the vehicle-mounted terminal from the millimeter wave radar apparatus, a third message that meets the second preset condition, wherein the second preset condition includes information that the millimeter wave radar apparatus detects a change in position of the mobile terminal.

14. The method according to claim 8, further comprising: when the second position of the first passenger corresponds to an area of a second seat, establishing, by the vehicle-mounted terminal, a third correspondence between the first passenger space and the second seat; and sending, by the vehicle-mounted terminal, the third correspondence to the mobile terminal to transfer the first application displayed on the first display of the vehicle-mounted terminal to a second display of the vehicle-mounted terminal, wherein the second display is a display corresponding to the second seat.

15. A vehicle-mounted terminal, comprising: one or more memories storing program instructions; and one or more processors coupled to at least one of the one or more memories, wherein execution of the program instructions by at least one of the one or more processors causes the vehicle-mounted terminal to:

receive, from a UWB base station, a first position of a mobile terminal;

receive, from a millimeter wave radar apparatus, a second position of a first passenger space, wherein:

when the first position and the second position belong to a common seat area, establish, by the vehicle-mounted terminal, a first correspondence between the mobile terminal and the first passenger space; and when the second position of the first passenger space corresponds to an area of a first seat, establish, a second correspondence between the first passenger space and the first seat; and send the second correspondence to the mobile terminal; and transferring, by the mobile terminal a first application running on the mobile terminal to a first display on the vehicle-mounted terminal based on the second correspondence.

16. The vehicle-mounted terminal according to claim 15, wherein execution of the program instructions by at least one of the one or more processors further causes the vehicle-mounted terminal to:

send a first message to the mobile terminal when a first preset condition is met instructing the mobile terminal to start application transfer;

receive from the mobile terminal a first request to obtain information about the first display corresponding to the first seat; and return to the mobile terminal the information about the first display to invoke the first display of the vehicle-mounted terminal to display an interface of the first application running on the mobile terminal.

17. The vehicle-mounted terminal according to claim 15, wherein execution of the program instructions by at least one of the one or more processors further causes the vehicle-mounted terminal to:

send a first message to the mobile terminal when a first preset condition is met, wherein the first message instructs the mobile terminal to start application transfer;

receive information about the first application from the mobile terminal;

start the first application on the vehicle-mounted terminal based on the information about the first application; and invoking the first display to display an interface of the first application based on the second correspondence.

18. The vehicle-mounted terminal according to claim 15, wherein execution of the program instructions by at least one of the one or more processors further causes the vehicle-mounted terminal to: receive a second message from millimeter wave radar apparatus that meets a first preset condition, wherein the first preset condition comprises information that the millimeter wave radar apparatus detects a change in position of the mobile terminal.

19. The vehicle-mounted terminal according to claim 15, wherein execution of the program instructions by at least one of the one or more processors further causes the vehicle-mounted terminal to:

stop transferring the first application on the mobile terminal to the first display on the vehicle-mounted terminal when a second preset condition is met or instruct the mobile terminal to stop transferring the first application to the first display on the vehicle-mounted terminal.

20. The vehicle-mounted terminal according to claim 19, wherein execution of the program instructions by at least one of the one or more processors further causes the vehicle-mounted terminal to:

receive from the millimeter wave radar apparatus a third message that meets the second preset condition, wherein the second preset condition includes information that the millimeter wave radar apparatus detects a change in position of the mobile terminal.

* * * * *